United States Patent
Bettini et al.

(10) Patent No.: US 9,178,852 B2
(45) Date of Patent: *Nov. 3, 2015

(54) IN-LINE FILTERING OF INSECURE OR UNWANTED MOBILE DEVICE SOFTWARE COMPONENTS OR COMMUNICATIONS

(71) Applicant: Appthority, Inc., San Francisco, CA (US)

(72) Inventors: Anthony John Bettini, San Francisco, CA (US); Kevin Watkins, San Francisco, CA (US); Domingo J. Guerra, San Francisco, CA (US); Michael Price, San Ramon, CA (US)

(73) Assignee: Appthority, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,151

(22) Filed: Jul. 14, 2014

(65) Prior Publication Data

US 2014/0331281 A1    Nov. 6, 2014

Related U.S. Application Data

(63) Continuation of application No. 13/740,061, filed on Jan. 11, 2013, now Pat. No. 8,819,772.

(60) Provisional application No. 61/664,109, filed on Jun. 25, 2012, provisional application No. 61/692,156, filed on Aug. 22, 2012.

(51) Int. Cl.
*G06F 21/56* (2013.01)
*H04L 29/06* (2006.01)

(52) U.S. Cl.
CPC ........ *H04L 63/0227* (2013.01); *H04L 63/0245* (2013.01)

(58) Field of Classification Search
USPC .................................. 726/24, 25, 1; 713/189
See application file for complete search history.

(56) References Cited

U.S. PATENT DOCUMENTS

| | | | | |
|---|---|---|---|---|
| 5,757,915 | A * | 5/1998 | Aucsmith | G06F 21/51 713/167 |
| 7,779,472 | B1 | 8/2010 | Lou | |
| 8,756,693 | B2 | 6/2014 | Dube et al. | |
| 2005/0283429 | A1 * | 12/2005 | Bates | G06Q 20/40 705/38 |

(Continued)

OTHER PUBLICATIONS

Seo et al., Analysis on Maliciousness for Mobile Applications, 2012 Sixth International Conference on Innovative Mobile and Internet Services in Ubiquitous Computing, pp. 126-129, 2012.

*Primary Examiner* — Joseph P Hirl
*Assistant Examiner* — Sayed Beheshti Shirazi
(74) *Attorney, Agent, or Firm* — Van Pelt, Yi & James LLP

(57) ABSTRACT

Techniques for in-line filtering of insecure or unwanted mobile components or communications (e.g., insecure or unwanted behaviors associated with applications for mobile devices ("apps"), updates for apps, communications to/from apps, operating system components/updates for mobile devices, etc.) for mobile devices are disclosed. In some embodiments, in-line filtering of apps for mobile devices includes intercepting a request for downloading an application to a mobile device; and modifying a response to the request for downloading the application to the mobile device. In some embodiments, the response includes a notification that the application cannot be downloaded due to an application risk policy violation.

27 Claims, 16 Drawing Sheets

(56) References Cited

U.S. PATENT DOCUMENTS

| | | | |
|---|---|---|---|
| 2007/0258469 A1* | 11/2007 | Bennett | H04L 63/145 370/400 |
| 2007/0294273 A1* | 12/2007 | Bendeck | G06F 17/30032 |
| 2007/0294373 A1* | 12/2007 | Harrison | H04L 29/06 709/219 |
| 2008/0134138 A1 | 6/2008 | Chamieh et al. | |
| 2012/0072561 A1* | 3/2012 | Rebacz | A63F 13/12 709/223 |
| 2012/0110674 A1* | 5/2012 | Belani | H04W 4/001 726/25 |
| 2012/0246484 A1* | 9/2012 | Blaisdell | G06F 21/52 713/189 |
| 2013/0097660 A1* | 4/2013 | Das | H04L 63/10 726/1 |
| 2013/0212638 A1* | 8/2013 | Wilson | H04L 63/20 726/1 |

* cited by examiner

FIG. 4

- FILE MD5: 314B4516793879B21C822AFB5A718A15
- FILE SHA-1: 0D72075CB3E9D2BAA35FB78E3DFF969C514BF2CB
- APPLICATION FILE SIZE: 682201
- APPLICATION VERSION: 1.0
- SUBMISSION RECEIVED: 2012-04-27 16:55:08 UTC
- ANALYSIS PROGRESS: 100% COMPLETE
- SCANNED WITH ENGINE VERSION: 2.2.0
- SCANNED WITH RULE SET VERSION: 1.6.0

RISKY BEHAVIORS:

- THIS APPLICATION WASN'T COMPILED AS A POSITION INDEPENDENT EXECUTABLE (PIE) WHICH CAN EXPOSE THE APPLICATION TO MEMORY CORRUPTION ATTACKS.
- THIS APPLICATION WASN'T FOUND ON THE OFFICIAL APPLE APP STORE. THE ORIGINS OF THIS APPLICATION CANNOT BE VERIFIED.

PRIVACY BEHAVIORS:

- THIS APPLICATION INCLUDES FILE PATHS TO SOURCE CODE FILES IN DEBUG INFORMATION STORED WITHIN THE APPLICATION EXECUTABLE IMAGE. THESE PATHS OFTEN INCLUDE USERNAMES OR OTHER INFORMATION RELATED TO THE DEVELOPER OF THE APPLICATION. THIS INFORMATION COULD BE USED TO ASSIST IN TARGETING THE APPLICATION DEVELOPER OR DEVELOPMENT COMPANY.
- THIS APPLICATION INCLUDES FILE PATHS TO SOURCE CODE FILES IN DEBUG INFORMATION STORED WITHIN THE APPLICATION EXECUTABLE IMAGE. THESE PATHS OFTEN INCLUDE USERNAMES OR OTHER INFORMATION RELATED TO THE DEVELOPER OF THE APPLICATION. THIS INFORMATION COULD BE USED TO ASSIST IN TARGETING THE APPLICATION DEVELOPER OR DEVELOPMENT COMPANY.

HOSTNAME AND IP ADDRESSES:

| HOSTNAME/ADDRESS | REPUTATION |
| --- | --- |
| HTTPS://APPRAMP.APPERIAN.COM/PUBLIC-EASE-SDK.INTERFACE.PHP | N/A |
| IDAP://LOCALHOST/ | N/A |
| HTTPS://WWW.APPLE.COM/APPLECA/0 | N/A |
| HTTP://WWW.APPLE.COM/APPLECA/0 | N/A |

APPERIAN HOME   PRIVACY POLICY

FIG. 5 (Cont.)

IN-LINE FILTERING OF INSECURE OR UNWANTED MOBILE DEVICE SOFTWARE COMPONENTS OR COMMUNICATIONS

CROSS REFERENCE TO OTHER APPLICATIONS

This application is a continuation of co-pending U.S. patent application Ser. No. 13/740,061 entitled IN-LINE FILTERING OF INSECURE OR UNWANTED MOBILE DEVICE SOFTWARE COMPONENTS OR COMMUNICATIONS filed Jan. 11, 2013, which claims priority to U.S. Provisional Patent Application No. 61/664,109 entitled IN-LINE FILTERING OF INSECURE OR UNWANTED MOBILE DEVICE SOFTWARE COMPONENTS OR COMMUNICATIONS filed Jun. 25, 2012 and U.S. Provisional Patent Application No. 61/692,156 entitled IN-LINE FILTERING OF INSECURE OR UNWANTED MOBILE DEVICE SOFTWARE COMPONENTS OR COMMUNICATIONS filed Aug. 22, 2012, all of which are incorporated herein by reference for all purposes.

BACKGROUND OF THE INVENTION

An application, also referred to as an "app," generally refers to a software application that executes on a computing device, such as a mobile device. For example, mobile devices include smart phones, tablets, laptops, and/or other mobile devices. Various application platforms exist for different operating systems, such as Microsoft Windows® platforms, Google Android® platforms, and Apple iOS® platforms. Application markets exist for each of these application platforms, which can make available thousands to millions of different apps for such platforms.

For example, various apps are available for executing on smart phones such as the HTC EVO® or Apple iPhone®, tablets such as the Motorola Xoom® or Apple iPad®, embedded devices executing the Google Android® operating system such as those shipped by Mentor Graphics and their partners, and computer operating systems such as Apple Mac OS X® and Microsoft Windows 8®.

BRIEF DESCRIPTION OF THE DRAWINGS

Various embodiments of the invention are disclosed in the following detailed description and the accompanying drawings.

FIG. 4 is a screen diagram of an apps view of a user interface for a platform for quantifying risks of apps for mobile devices in accordance with some embodiments.

DETAILED DESCRIPTION

Figure 1:
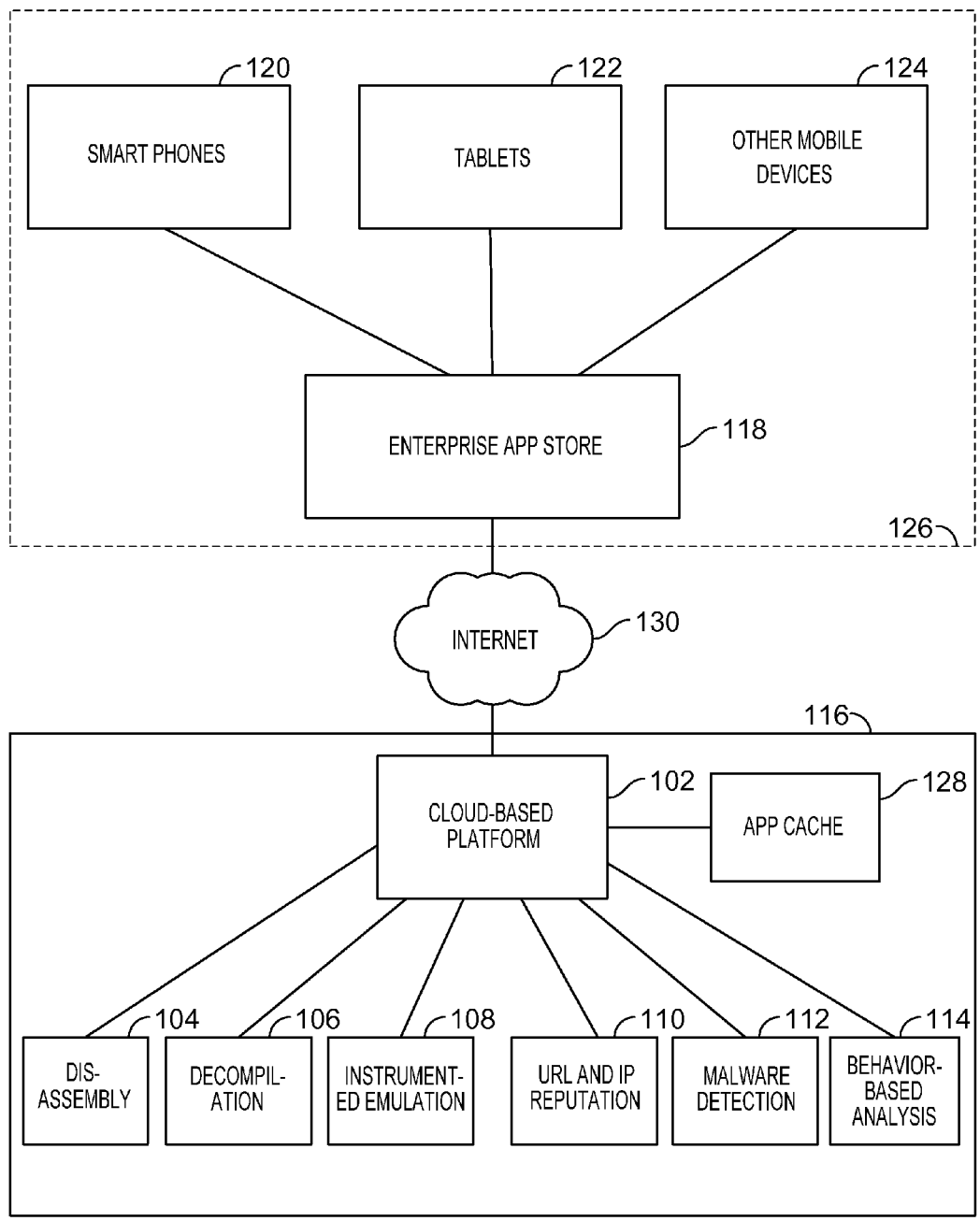
FIG. 1 is a functional block diagram of an architecture for quantifying the risks of applications ("apps") for mobile devices in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An application, also referred to as an "app," generally refers to a software application that executes on a computing device, such as a mobile device (e.g., a mobile device refers to a computing device that includes a processor for executing a software application). For example, mobile devices include smart phones, tablets, laptops, and/or other mobile devices. Various application platforms exist for different operating systems, such as Microsoft Windows® platforms, Google Android® platforms, and Apple iOS® platforms. Application markets (e.g., app stores) exist for each of these application platforms, which can make available thousands to millions of different apps for such platforms.

For example, various apps are available for executing on smart phones such as the HTC EVO® or Apple iPhone®, tablets such as the Motorola Xoom® or Apple iPad®, embedded devices executing the Google Android® operating system such as those shipped by Mentor Graphics and their partners, and computer operating systems such as Apple Mac OS X® and Microsoft Windows 8®.

Also, as these operating system platforms for mobile devices converge with legacy computer desktop and laptop operating system platforms (e.g., Microsoft Windows® 8 and Apple Mac OS X®), similar app markets and availability of common apps across such platforms are becoming increasingly common.

With hundreds of thousands to millions of different apps for such platforms available to consumers, enterprises (e.g., various entities, including corporate entities, government entities, and other entities) are confronted with supporting and/or managing these various devices that can have a variety of such apps on users' devices. Enterprise challenges include the increasing usage by, for example, employees of their own devices that can have access to corporate resources (e.g., employee smart phones, tablets, etc.). The ever growing number and variety of apps also poses a significant challenge for entities to manage and monitor the downloading, installation, and usage of such apps by users on devices that can have access to corporate resources.

However, the trend towards using these apps for enterprise uses and/or on devices that may have enterprise access also presents new and complex challenges for enterprises (e.g., Information Technology (IT) at enterprises and/or management for such enterprise's information and technology) and for consumers to understand risks posed by such apps. In particular, these apps can present various risks to the enterprise and/or users.

For example, apps can have access to enterprise resources, such as a corporate address book, corporate intellectual property, corporate Wi-Fi network(s), VPN access, and/or various other enterprise resources. Because apps can have access to corporate resources, it is desirable for the enterprise to understand and quantify the risks associated with apps that have been downloaded or can be downloaded to devices used by, for example, employees of the entity or other users who have access to any enterprise resources (e.g., on the mobile device and/or on the enterprise network).

Mobile devices present unique challenges as a majority or significant amount of the mobile malware and risky behaviors are delivered through apps (e.g., payloads with apps). In particular, app markets expose the undesirable trends of increasing malware present in various apps or vulnerabilities of such apps that can be exploited by malware or sophisticated attacks (e.g., intrusions, etc.), privacy risks (e.g., spyware or other malware), resource usage (e.g., CPU, memory, storage, battery, network, and/or other physical device resources), and/or other intellectual property related risks (e.g., data loss, intellectual property theft, etc.) exposed by such apps and/or vulnerabilities present in such apps. As the app market evolves and sophistication of the security risks increase, the approach of only using blacklists is generally insufficient to address these evolving security related challenges of apps for mobile devices.

Enterprises (e.g., companies, governmental organizations, and/or other entities) generally support employees and other users (e.g., contractors, guests, and/or other users associated with the enterprise) who use various types of mobile devices at work, such as smart phones, tablets, laptops, and/or various other types of mobile devices. However, provisioning anti-malware and/or enforcing enterprise customized anti-malware policies by provisioning anti-malware on each such device can be a cumbersome and often futile task as employees may bring their own devices to work (BYOD) and/or frequently replace or upgrade such devices.

However, with more and more mobile apps showing up on mobile devices such as smart phones, tablets, laptops, and/or embedded devices, enterprises and users want to be ensured that the apps installed on their mobile devices do not include malware. Many if not most malware for mobile devices are delivered using apps as payloads for getting such malware installed/executed on the mobile device.

In addition, on many mobile devices, particularly smart phones, tablets, and embedded devices, the devices themselves can be resource constrained (e.g., limited CPU capabilities, limited memory capabilities, limited storage, and/or strong dependency on the battery). These resource limitations can put tight constraints on resource-intensive operations, such as malware detection systems. For example, many malware detection systems rely upon emulation or dynamic analysis (e.g., running the software within the context of an instrumented emulator), which can be a very resource intensive operation. As a result, this operation, because of both hardware resource constraints and software sandboxing common on mobile devices, makes traditional dynamic analysis "on-device" impractical and/or undesirable. To further limit "on-device" malware detection, permission models implemented on the mobile device can restrict a level of access to successfully analyze arbitrary apps for malware behaviors. However, there is still a need to detect new and unknown malware, in an ever growing number and diversity of apps available for mobile devices (e.g., through public and/or private/enterprise app stores).

In addition, mobile devices and the operating systems for mobile devices are susceptible to unique security, privacy, and other issues of concern. Applications ("apps") that are malicious in nature or that perform undesirable operations can be downloaded and installed onto mobile devices over the network (e.g., the Internet). Apps may also transmit data over the network that should not be transmitted, such as location information (e.g., GPS coordinates), address book information, and/or other information. Also, this data may be transmitted not only via the traditional IP networks but also via cellular networks.

Also, there are no existing solutions for using a device-based solution to generate an app inventory on certain types of mobile devices. For example, there are no existing solutions for using a device-based solution to generate an app inventory on Apple iOS®-based devices, because the Apple iOS® sandbox on the device does not permit an app inventory (e.g., listing of apps installed on the device) to be generated (e.g., any apps in the Apple app store must comply with the Apple iOS® sandbox rules, which do not permit generating such an app inventory). As a result, there are no existing device-based anti-malware solutions that perform anti-malware app scanning available for iOS®-based devices.

Traditional anti-malware solutions operate "on-device," meaning the file or application being checked for malware is checked for malware on the same device that the application is expected to run on. More specifically, traditional anti-malware solutions leverage on-device or on-system static analysis to decide if a file, executable, or application is malware or not. What are needed are techniques for performing anti-malware analysis for apps installed on mobile devices using out-of-band or "off-device" techniques.

Thus, techniques for off-device anti-malware solutions for mobile devices are needed. Accordingly, various techniques for in-line filtering of insecure or unwanted mobile components or communications (e.g., insecure or unwanted behaviors associated with applications for mobile devices ("apps"), updated versions of apps, communications to/from apps, operating system components/updates for mobile devices, etc.) for mobile devices are disclosed. For example, using various techniques described herein, an anti-malware policy (e.g., an anti-malware policy can be customized for particular entities or categories of entities, such as banks or health care entities, etc.) can specify undesirable behaviors and/or other attributes that can be used to identify insecure or unwanted mobile components or communications.

Larger communications networks are generally built as an aggregate of smaller networks. These smaller networks are generally joined to larger networks by routers, and routers or devices placed before or after them generally contain support for analysis and optional blocking (e.g., filtering) of insecure or unwanted data. Mobile devices such as mobile phones or tablets connect to these networks and use these networks to send and receive data such as software components including operating system updates or third-party applications (e.g., apps and/or app updates), or to communicate with other devices. Thus, using the various techniques disclosed herein, the filtering of data previously described is extended to filter insecure or unwanted data communications generated as a result of mobile device interactions on the network.

For example, organizations such as enterprises or cellular network carriers generally require the capability to identify and optionally block insecure or unwanted data generated as a result of mobile device interaction on the network. In some embodiments, a cloud-based app risk analysis technique can be integrated with network devices (e.g., in-line filtering devices, such as security appliances, routers, and gateways) to facilitate identifying such insecure or undesired data communications (e.g., apps/app updates, OS updates/components, or communications to/therefrom, that violate a policy related to mobile devices) for blocking or performing other responsive actions, and to thereby provide such organizations with effective and efficient mechanisms to manage and secure against the evolving and increasing mobile device-related threats and/or vulnerabilities.

In some embodiments, in-line filtering of applications ("apps") for mobile devices is provided. In some embodiments, in-line filtering of applications for mobile devices includes intercepting a request for downloading an application to a mobile device and modifying a response to the request for downloading the application to the mobile device. In some embodiments, the response includes a notification that the application cannot be downloaded due to an application risk policy violation. In some embodiments, in-line filtering of apps for mobile devices further includes filtering traffic in-line from the mobile device to a network (e.g., the Internet); determining that the filtered traffic from the mobile device includes the request for downloading the application to the mobile device; and determining the response to the application request based on an application risk policy, in which the application risk policy is configured for an enterprise, and in which the mobile device is associated with the enterprise. In some embodiments, in-line filtering of apps for mobile devices further includes determining the response based on an application risk assessment for the application, in which the application risk assessment is based at least in part on a behavior associated with the application. In some embodiments, in-line filtering of apps for mobile devices further includes determining the application associated with the request violates a policy (e.g., an application risk policy) based on an application analysis (e.g., an automated risk assessment) of the application.

In some embodiments, in-line filtering of applications ("apps") for mobile devices is provided. In some embodiments, in-line filtering of applications for mobile devices includes performing in-line filtering of traffic from a mobile device to a network (e.g., the Internet); identifying an application request from the in-line filtering of traffic from the mobile device to the network, in which the application request includes a request to download an application to the mobile device; and modifying a response to the application request that is communicated to the mobile device. In some embodiments, the modified response includes a notification that the application cannot be downloaded due to an application risk policy violation. In some embodiments, in-line filtering of apps for mobile devices further includes determining the response to the application request based on an application risk policy. In some embodiments, in-line filtering of apps for mobile devices further includes determining the response to the application request based on an application risk policy, in which the policy includes an application risk profile based on behavior associated with the application. In some embodiments, in-line filtering of apps for mobile devices further includes intercepting application requests from a plurality of mobile devices.

In some embodiments, in-line filtering of insecure or unwanted mobile device communications for mobile devices is provided. In some embodiments, in-line filtering of insecure or unwanted mobile device communications for mobile devices includes intercepting an application search request from a client device to a public application market; and modifying a response to the application search request to filter applications listed in the response based on an application risk policy. In some embodiments, the modified response includes a notification that one or more applications responsive to the application search request were removed from the response due to the application risk policy violation.

In some embodiments, in-line filtering of insecure or unwanted mobile device communications for mobile devices is provided. In some embodiments, in-line filtering of insecure or unwanted mobile device communications for mobile devices includes intercepting a communication from a mobile device at an in-line filtering device and determining whether the communication from the mobile device includes an insecure or unwanted mobile device communication. In some embodiments, the determination that the communication from the mobile device includes an insecure or unwanted mobile device communication is based on a traffic policy for mobile device communications. In some embodiments, in-line filtering of insecure or unwanted mobile device communications for mobile devices further includes blocking the communication from the mobile device if it is determined that the communication from the mobile device is an insecure or unwanted mobile device communication based on a traffic policy for mobile device communications.

FIG. 1 is a functional block diagram of an architecture for quantifying the risks of applications ("apps") for mobile devices in accordance with some embodiments. As shown, a platform 116 is provided for quantifying the risks of apps for mobile devices that is in communication with an enterprise network 126 via the Internet 130. The enterprise network 126 includes an enterprise app store 118 (e.g., an enterprise that has its own internal app store for providing apps for mobile devices used by its users, such as its employees, contractors, etc.) that provides apps for enterprise mobile devices, including smart phones 120, tablets 122, and/or other mobile devices 124 (e.g., laptops, etc.). For example, using the various techniques described herein, the platform 116 can be used to automatically assess the risks of apps being distributed by the enterprise app store 118 (e.g., based on a policy, such as an enterprise risk policy/profile). Accordingly, the platform 116 screens all apps that are available in the enterprise app store 118.

In some embodiments, the platform 116 implements a holistic approach to screening apps, and can automatically analyze apps for mobile devices to determine various properties, such as one or more of the following: market reputation of the app; presence of malware; insecure programming practices; malicious changes to existing apps; data exfiltration; corporate intellectual property (IP) impacts; cryptographic weakness or implementation faults; security risks; privacy concerns (e.g., location tracking, extracting contact book, sharing browsing history, etc.); energy usage (e.g., CPU cycles measured and compared with apps in similar categories or other versions of the same app, such as Facebook app version X v. version Y); and network usage. For example, these techniques performed by the platform 116 can be implemented as a fully automated solution for quantifying the risks of apps for mobile devices that can increase the detection of known malware, screen for new and/or unknown malware, identify risks in operating systems (e.g., including the Google Android® operating system and the Apple iOS® operating system), and can integrate with a mobile device management (MDM), app store, and integrated development environment (IDE) solutions.

In some embodiments, the platform 116 implements the holistic approach to screening apps using a phased implementation to risk assessment of apps for mobile devices. As shown, the platform 116 includes a cloud-based platform 102. For example, the cloud-based platform 102 can provide a global app cache (e.g., the platform 116 can service a plurality of enterprise app stores), including an app cache 128 for caching results for previously analyzed apps as shown in FIG. 1. The cloud-based platform 102 is in communication with a series of data collection engines, including: a disassembly engine 104, a decompilation engine 106, an instrumented emulation engine 108, a URL and IP reputation engine 110, a malware detection engine 112, and a behavior-based analysis engine 114. For example, the platform can include various engines, such as shown, for performing various functions and collecting various data based on the functions, which can be used for later app risk assessment and analysis as well as shared with one or more of the various other engines, such as described herein with respect to various embodiments.

In some embodiments, the platform 116 for quantifying the risk of apps has the following characteristics: varying a number of phases of data collection and analysis, depending upon the platform and type of app; a series of phases of analysis that run, for purposes of collecting data, followed by a collection of rules that then process the collected data; rules that identify behaviors, characteristics, or properties, which present risks to the enterprise or consumer; and a report generation phase, in which the relevant findings/results from the rules execution phase are reported to end users (e.g., the enterprise and consumers).

Figure 2:
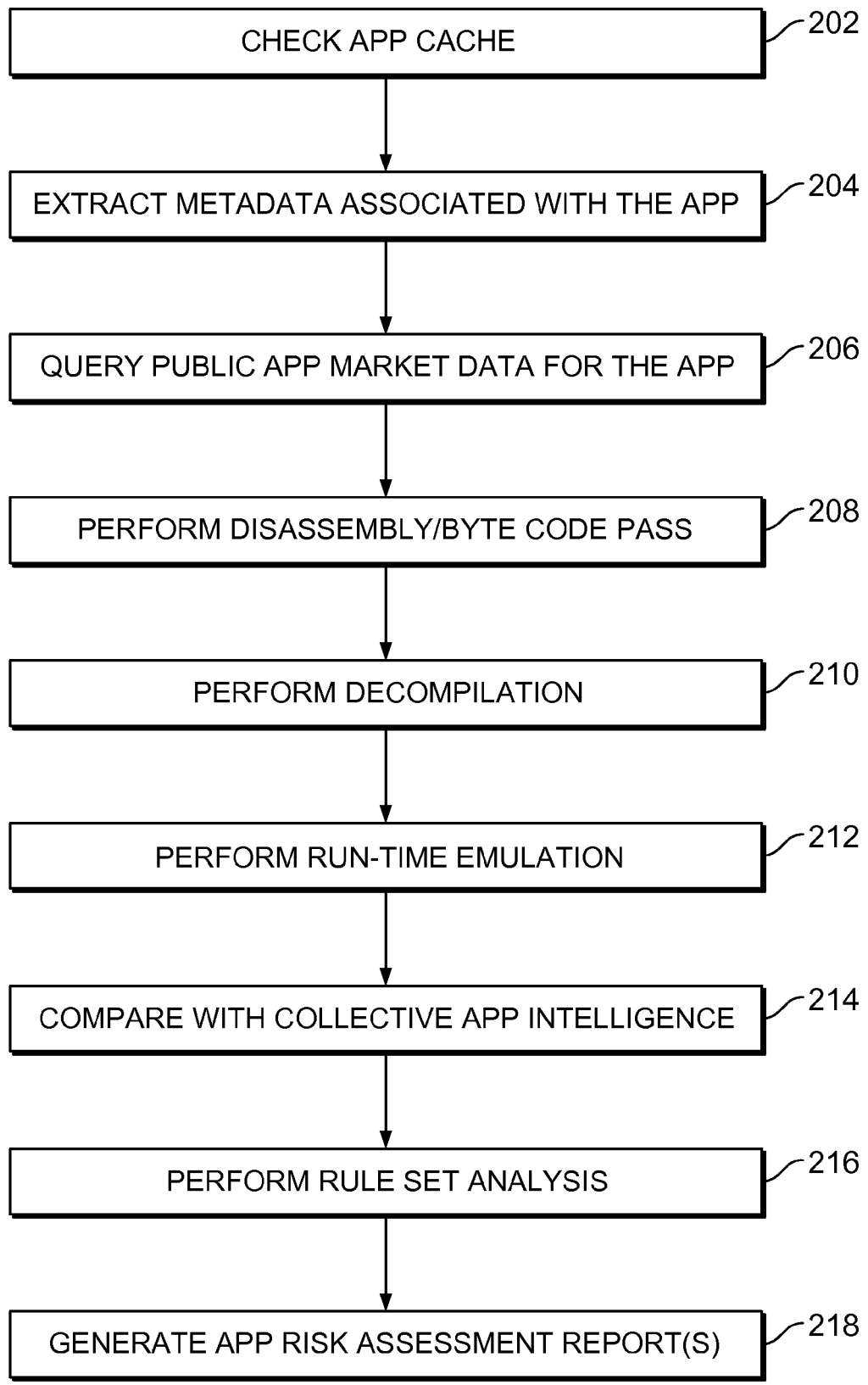
FIG. 2 is a flow diagram for quantifying the risks of apps for mobile devices in accordance with some embodiments.

FIG. 2 is a flow diagram for quantifying the risks of apps for mobile devices in accordance with some embodiments. In some embodiments, a platform for quantifying the risks of apps for mobile devices implements a phased approach to risk assessment of apps for mobile devices. In some embodiments, the phased approach includes one or more of the phases as shown in FIG. 2 and discussed in detail below. In some embodiments, the platform for quantifying the risks of apps for mobile devices uses a series of data collection engines for implementing the phased approach, such as shown in FIG. 1.

In some embodiments, an app query to the platform for quantifying the risks of apps for mobile devices initiates the process. For example, an enterprise app store (e.g., enterprise app store 118 as shown in FIG. 1, which can be implemented using a commercially available MDM solution) can communicate with a cloud service/web platform for quantifying the risks of apps for mobile devices (e.g., platform 116 as shown in FIG. 1) using a web service (e.g., RESTful web API or REST API) to communicate an app (e.g., one or more apps for the enterprise app store) that is to be automatically analyzed for a risk assessment by the cloud service/platform. In some embodiments, the Rest API supports auth tokens for providing authorization and authentication of such app queries to provide a secure communication mechanism. At 202, in response to the app query, a pre-screen analysis phase is performed that includes checking an app cache (e.g., a cache that includes information for apps that were previously analyzed by the platform). In some embodiments, if the platform has already analyzed that app (e.g., that particular version of the app), then the previously determined risk score (e.g., app reputation score and possible additional data) is returned (e.g., at near wire speed). This approach highlights the value of pre-screening apps (e.g., several hundreds of thousands of apps can have already been pre-screened by the platform using these techniques).

In some embodiments, after uploading an application (e.g., an App container) using the Rest API, an application ID number is returned. For example, the application ID number can be used as a key to view the results or to perform more advanced analysis. In some embodiments, various fields are used including the following: an application data field is used to identify the app file; and an origin field is used to set the source (e.g., origin) of an app. For example, the origin field can be set to "public" or "private" depending on where the application came from, with "public" indicating that the app is from a public source (e.g., a public app store) and "private" indicating that the app is primarily used internally and not meant for general consumption. Among other restrictions, apps marked as private can be hidden from global app cache queries.

In some embodiments, the returned app ID can be used for subsequent queries based on the app ID, such as for reports based on one or more provided App IDs (e.g., individual app query—reporting on an individual app based on a request to find a specified app in the global cache, bulk app query—reporting on a plurality of apps based on a bulk request to find apps in the global cache, updated reports, and/or more advanced reports). In some embodiments, polling is supported to determine when the platform has completed the analysis of an app (e.g., based on a specified app ID) and that a report is ready based on the completed analysis by the platform. In some embodiments, querying (e.g., using the Rest API) the platform to find applications that have already been analyzed by the platform and are stored in the global app cache (e.g., app cache 128 as shown in FIG. 1) are supported (e.g., comparing an app file hash to hash stored in the global app cache, querying by the app name, and/or using various other techniques), as described in further detail below.

In some embodiments, such app queries will have already been analyzed by the platform and, thus, will trigger a near wire speed response to such app queries. In particular, in many cases the app will already be part of the app cache (e.g., app cache 128 as shown in FIG. 1) and already analyzed. In some embodiments, to check if the app is already in the app cache, all that is needed is a hash of the application (e.g., using a hashing algorithm, such as MD5, SHA-1, SHA-256, or another hashing algorithm) to query the app cache for a match.

In some embodiments, an app query specifies one or more of the following: a unique ID for the transaction, a match type (e.g., all to return all app matches, latest to return a newest app match), platform (e.g., Google Android platform, Apple iOS platform, Microsoft Windows platform, etc.), app name, app version, package name (e.g., package name for Android apps, bundle identifier for iOS apps), source of the app (e.g., enterprise or device), app size (e.g., Android APK file size, iOS bundle size), app size memory (e.g., iOS dynamic size), app hash (e.g., such as MD5, SHA-1, SHA-256, or another hashing algorithm), app signature (e.g., a signature for Android apps), item ID (e.g., iOS 9-digit number specific to iOS apps, Android Market asset ID for Android apps), and local (e.g., specifying the language of the report data).

Below is an example query to the platform from an app catalog (e.g., an app store, such as an enterprise app store).

```
API Name: query_app
API Description: queries one individual app, returns one result;
does not require a sequence number; similar format to bulk_query_app;
can produce findings based on incomplete metadata
Type of HTTP call: POST
Parameters: [0 required, 13 optional]
- sequence_num (optional) (a unique ID for the transaction)
- platform (optional) {Android, iOS, Windows, etc.}
- app_name (optional) (Name of the app)
- app_version (optional) (Version of the app)
- package (optional) (Package name for Android apps; Bundle Identifier
for iOS apps [may be referred to as URL/URIs])
- app_location_source (optional) { enterprise, device }
- app_size_disk (optional) (Android APK file size; iOS Bundle Size)
- app_size_memory (optional) (C Dynamic Size)
- app_hash_md5 (optional) (MD5 of the APK/XAP file itself; on iOS,
MD5 of the app executable, which is contained
within the IPA [ZIP] archive)
- app_hash_sha1 (optional) (SHA-1 of the APK/XAP file itself;
on iOS, SHA-1 of the app executable, which is contained
within the IPA [ZIP] archive)
- app_hash_sha256 (optional) (SHA256 of the APK/XAP file itself;
on iOS, SHA256 of the app executable, which is contained within
the IPA [ZIP] archive)
- app_signature (optional) (Specific to Android, looks like:
ZdKozWeudHKt2VwVCFpH7dMi2hE)
- item_id (optional) (9-digit # that is specific to iOS apps;
on Android Market asset id)
```

The above example is an example of querying one individual app. As further described herein with respect to various embodiments, the platform also supports "bulk queries" whereby, for example, a customer (e.g., an app store/app catalog, the MDM server, the MAM app catalog, etc.) can submit to the app risk assessment platform the metadata on a plurality of apps (e.g., hundreds to thousands of apps at a time), and the platform replies with the results for each of the analyzed apps.

In some embodiments, a customer of the service for quantifying the risks of apps for mobile devices can query the platform as described herein. In some embodiments, each customer can create users for the organization, which may have varying permissions. For example, the corporate IT team of ACME Corporation can have one or more users that have accounts with access to the platform. The corporate IT team can also configure their account to have specific IT requirements for apps scanned on behalf of ACME Corporation (e.g., custom scanning, and/or custom reporting requirements, such as based on security requirements, privacy requirements, and/or various other criteria as described herein). The corporate IT team can also create scripts that automatically query the platform for reports on apps being considered for adding to the enterprise app store, including existing apps (e.g., previously scanned apps), updated versions of existing apps, and/or new apps. Using these techniques, the corporate IT team can effectively manage the enterprise app store to ensure that the apps available in the enterprise app store satisfy their corporate IT requirements (e.g., security, privacy, device integrity, network integrity, etc.).

In particular, if the app already exists in the app cache (i.e., there is a match to the query of the app cache), then the pre-existing app ID will be returned. Otherwise, that is, if the app cache check does not result in a match or hit, then processing continues to stage 204, which is discussed below.

In some embodiments, a phased analysis is performed by the platform for quantifying the risks of apps for mobile devices, in which data is collected at each phase or stage of analysis by the platform for a given app being analyzed for a risk assessment. At 204, metadata associated with the app is extracted. In particular, metadata associated with the app can include information that is important for assessing the overall risk(s) associated with the app. For example, this phase can include parsing an XML file associated with the app that hosts general app information. Metadata associated with the app that can be analyzed includes app permissions, intents, services, and receivers. In particular, this phase can include mapping out app permissions, file and version name, app author, app ID, package name, and/or various other attributes and/or metadata associated with the app. In some embodiments, this stage further includes inspecting app components including accepting a component of an app, such as a metadata file or an executable image, absent in the remainder of the app, to analyze and generate any potential findings based on the parsed and analyzed metadata associated with the component of the app. As discussed further below with respect to stage 206, metadata associated with finding the app on the public and/or private app markets includes artist and publisher information, item IDs, genre IDs or categories, price for purchasing the app, release date of the app (e.g., app version), software version external identifiers, and vendor ID.

At 206, a query of public app market data for the app is performed. In particular, querying the public market(s) for data on the app can facilitate significant information about an app's risk based on an analysis of the public market data identified as associated with the app (e.g., using app descriptions, app rankings in the store, vendor reputations, and/or various other types of information). For example, various app attributes and/or metadata can be compared with such data for apps in public app markets. In particular, public app markets are generally available to consumers, such as Apple's App Store, Amazon's and Google's Android App Market, Microsoft's App Store, and other public app stores, unlike enterprise app markets which are generally only available to permitted enterprise users, such as enterprise employees and contractors. In some embodiments, the query of public app market data includes the following types of data (e.g., to facilitate analyzing whether such enterprise apps being analyzed have been repackaged with malware, such as a different version of an Angry Birds® app that has been re-packaged with malware): app size, content, version, and/or various other types of data. In some embodiments, analytics are performed on the app download count, user ratings, and developer reputation data. For example, for Android-based apps, each app's manifest can be deobfuscated (e.g., using Android APIs) and parsed to extract information of interest and for further analysis, as described above.

There are various examples in which this phase for querying of public app market data for the app can assist in determining an overall risk assessment for the app. As an example, a source of the app (e.g., which app market or app markets it's available from) can have an impact on an overall app risk, because some app markets are known to be riskier than other app markets. As another example, a new app with fewer downloads can have a higher risk than an older app with a larger number of downloads. As another example, an app developer's reputation can also have an impact on an overall app risk assessment. As another example, an average user rating can also have an impact on overall app risk assessment.

As another example, an app's file name, version, and app size can be compared between the publicly available app and the app submitted by the enterprise. If these fields vary, then these results indicate that the app may have been repackaged, which can also have an impact on overall app risk assessment (e.g., as such can indicate that the app could have been repackaged with a higher app risk). As another example, given that apps are typically signed by a developer with a private key and include information on who created the key, if an app is signed and includes different information than the publicly available app, this determination can also have an impact on overall app risk assessment (e.g., as such, can also indicate that the app could have been repackaged with a higher app risk).

In some embodiments, an app is uniquely identified using various techniques. For example, a hash of the app file (e.g., for Android app files, this can be a hash of the container; for iOS app files, this can be a hash of a .ipa file, which is an iPhone application archive file that stores an iPhone app, which is usually encrypted with Apple's FairPlay DRM technology), a hash of the executable, and/or a bundle ID can be used to uniquely identify each app. As an example, this information can be used to compare an app received in a query to the platform to compare it with previously analyzed apps to determine if there is a match with the previously analyzed apps.

In some embodiments, the platform attempts to correlate apps for the Apple iOS® operating system that are received (e.g., from app queries, for apps that are in enterprise app stores and/or are uploaded by users/customers) with apps that have been pre-collected by the platform and that have already been uploaded and analyzed by the platform. As discussed above, iOS-based apps generally include an executable program. In some embodiments, the platform decrypts any such executables included in an iOS-based app prior to uploading them. For example, if a user submits an app from the App Store that includes an encrypted executable, it would not normally match a previously uploaded app, as that app's executable would have been decrypted and, thus, would not be the same. In some embodiments, to solve this problem, the platform performs a series of comparisons, including the following: hashing the pre-collected app (e.g., the app container, including all contents), and comparing this to a hash of the newly uploaded app. If this hash matches, no further work is required. If a match is not made, then the executables for both the new and pre-existing apps are compared. For example, to make comparison of executables more likely to succeed, the platform can save the hash for both the encrypted as well as the unencrypted executable for every pre-collected app, and can then compare a hash of the newly uploaded app's executable to both of these values. If there is a match, then no further work is required. Otherwise, metadata from both apps including the app's "bundle identifier" and version can be compared, and if a match is made, no further work is required. Accordingly, using these three different matching techniques, it is possible to reliably match newly uploaded apps to apps previously uploaded to the platform, whether their executables re-encrypted or not.

In some embodiments, handling of DRM-related mechanisms, such as executable image encryption, is also provided using various techniques. In particular, if an app that is received by the platform is encrypted using DRM technology (e.g., apps for the iOS platform can be encrypted using DRM technology), then various approaches can be used to facilitate processing the app using the various phases and collection/analysis engines described herein with respect to various embodiments. In some embodiments, the platform can handle the encryption of apps in one of a variety of ways. An example technique that the platform can perform is to correlate the encrypted app with an unencrypted version of the app to match the app with such an unencrypted version of the app, such as based on the digital signature (e.g., a hash, such as using MD5, SHA-1, SHA-256, or another hashing algorithm) of the encrypted executable image of the app. As another technique, the platform can also decrypt the encrypted app on native hardware (e.g., leverage one or more iOS devices that have previously been jail broken to decrypt the apps natively at run-time). As yet another technique, the platform can decrypt the encrypted app using pure software decryption leveraging private keys from the operating system or native hardware.

At 208, a disassembly/byte code pass of the app is performed to provide a static analysis phase (e.g., as apps are typically provided by the enterprise app stores/public app stores only in executable formats). In some embodiments, a disassembly/byte code pass phase is performed using a disassembler, such as a disassembly engine (e.g., disassembly engine 104 as shown in FIG. 1). In some embodiments, a disassembly/byte code pass phase includes inspecting byte code or assembly language (e.g., if applicable) to determine what the app is supposed to do—how it is coded to perform. For example, native instructions and virtual machine (VM) byte codes can be processed and analyzed. In some embodiments, this phase includes extracting a control flow graph, method and function names, strings, data flow within the app's executable, and/or other information to facilitate a static analysis and/or to facilitate providing a source code conversion for the app, as discussed below in detail with respect to stage 210. For example, app methods, such as encryption methods, can be analyzed for risky behaviors (e.g., using hard-coded passwords to protect private data or calling methods with risky encryption algorithms). As another example, the static analysis phase can include determining whether certain behaviors are implemented by the app (e.g., performing an operation without user permission, such as sending text/SMS messages without a user's permission, using GPS/location services without a user's permission, and/or various other behaviors of potential interest, such as those described herein with respect to various embodiments). As yet another example, native instructions and VM byte codes can be processed and analyzed, and such can also be used to facilitate a source code conversion (e.g., decompilation phase) as further discussed below in detail with respect to stage 210.

At 210, a decompilation phase is performed to facilitate generating a source code version of the app (e.g., apps are typically provided by the enterprise app stores/public app stores only in executable formats). In some embodiments, a decompilation phase is performed using a decompilation engine (e.g., decompilation engine 106 as shown in FIG. 1). In some embodiments, the decompilation phase includes analyzing a software code path and mapping an app action tree. For example, this information can be used to facilitate dynamic analysis using such behavior code path information determined from the source code analysis. For example, this information can be used to compare actual behaviors to permission and intent requests. As another example, the dynamic analysis phase can include simulated behavior to monitor the app's behavior for determining whether certain behaviors are performed by the app (e.g., performing an operation without user permission, such as sending text/SMS messages by monitoring/intercepting attempts to send SMS messages, such as by hooking SMS calls in an Android framework for Android-based apps, and/or various other behaviors of potential interest, such as those described herein with respect to various embodiments). As yet another example, app analysis can also include performing decompilation (e.g., in the case of Android, java files) to identify risky behaviors, such as risky usage of private data and app usage of known risky method calls. In addition, such information can also be used by researchers to easily read and create new rules when an app is flagged as potentially risky.

In some embodiments, a web-based crawling engine for web apps is provided. In some embodiments, this technique includes running through a web-based code coverage tree and testing out available behaviors from the web app. Data is collected during the process so that behavioral rules can be applied to the data findings. Initially, the process enumerates through the web application (crawling), in the form of a discovery phase, to spider the web application looking for as many possible code paths in the tree as possible. Then the dynamic analysis is leveraged and fuzzing occurs (e.g., using a series of engines and rule sets) to find vulnerabilities, risk behaviors, and privacy concerns in the web application.

At 212, a run-time emulation is performed to provide a dynamic analysis phase (e.g., performing dynamic analysis using instrumented emulation). In some embodiments, a run-time emulation phase is performed using an instrumented emulation engine (e.g., instrumented emulation engine 108 as shown in FIG. 1). In some embodiments, the run-time emulation phase includes executing the app on one or more emulators (e.g., virtual machines or emulators, such as a platform version of Android provided using such emulators that simulate an Android app execution environment, in which apps executed in such an environment cannot detect that they are executing in an Android emulation environment as opposed to executing on an actual user's Android mobile device). For example, the dynamic analysis phase can monitor and analyze internal and external app API calls, including kernel level API calls. The dynamic analysis phase facilitates performing a deeper dive into risky behaviors that otherwise can be hidden from a static analysis (e.g., such as new components being downloaded during run-time/execution of the app and/or other suspicious and/or potentially malicious behaviors).

In some embodiments, a dynamic analysis (e.g., instrumented emulation) includes hosting a series (e.g., farm) of emulators, in which instrumenting as part of our analysis is provided. On some platforms, these are forked versions of open source operating systems, in which API hooks into the kernel, virtual machine, system calls, etc. are provided to monitor the apps executed in the emulated environment. On some platforms, a custom kernel and re-implemented standard libraries are used to allow the closed-source operating system apps to monitor the apps executed in the emulated environment. On some platforms, hooking and performing binary patching on "simulators" to monitor the apps are executed in the emulated environment. Once the app is executing in the emulated environment, the dynamic analysis phase collects data on API calls that occur (e.g., and the values returned from those APIs), so that a rule set can be applied to that data set. For example, correlating API calls to permissions can be determined using various static and dynamic techniques described herein to determine whether the app exhibits any behaviors that exceed or are outside the scope of authorizations—proper user permissions. In some embodiments, the apps are instrumented during run-time execution using a combination of one or more of the following: random behaviors, intents from other apps, and control flow graph(s) maps that attempt to reach certain API calls.

At 214, a comparison with collective app intelligence is performed to provide an app reputation phase. In some embodiments, a comparison with collective app intelligence phase is performed using a URL and IP reputation engine (e.g., URL and IP reputation engine 110 as shown in FIG. 1). For example, the collective app intelligence engine can monitor and extract information (e.g., scraping such information from these various app markets/app stores) on various apps and associated app developers across public (e.g., legitimate markets for apps) markets and private (e.g., grey/black markets for apps), which can be used to compare apps between such various markets, including with versions of apps on private app markets. In some embodiments, the app reputation phase includes running new app findings over an entire app library. Thus, this phase facilitates leveraging findings from previous apps to a new scan. In some embodiments, collective app intelligence can include receiving third party analysis input, such as third party input identifying known bad or suspicious IP addresses, URL addresses, SMS numbers, telephone numbers, ad network providers, apps, app developers, app stores, and/or any other information. In some embodiments, the app reputation phase includes comparing reputation data for IP addresses (e.g., the IP reputation, such as IP addresses known to be associated with downloading malware and/or IP addresses known to be associated with command and control (C&C) botnet activities), URL/URI addresses (e.g., the URL/URI reputation, such as URL/URI addresses known to be associated with downloading malware and/or URL/URI addresses known to be associated with command and control (C&C) botnet activities), SMS numbers (e.g., SMS number blacklists), telephone numbers (e.g., telephone number blacklists), ad network providers, and other external calls and/or other information associated with apps. Accordingly, the app reputation phase allows the automated platform to become more and more intelligent with each new app scan as it continues to increase its knowledge about apps, app developers, ad network providers, and related information.

At 216, a rule set analysis is performed to provide a malware detection phase and a behavior-based analysis phase. In some embodiments, a malware detection phase and a behavior-based analysis phase are performed using a malware detection engine and a behavior-based analysis engine (e.g., malware detection engine 112 and behavior-based analysis engine 114 as shown in FIG. 1). In some embodiments, the behavior-based analysis phase includes running data extracted over each phase of analysis through an extensive set of behavioral rules. The behavior-based analysis phase can be used to determine if the app includes previously known malware, exhibits new malware behaviors, and/or if the app otherwise poses a risk, (e.g., privacy, security, or other risks). In some embodiments, enterprise specific (e.g., custom) rules are performed (e.g., enterprise defined risks, based on an enterprise risk profile). For example, enterprise specific (e.g., custom) rules can include checks for HIPAA compliance for healthcare apps, checks for encryption requirements for data management, and various other types of enterprise specific rules.

In some embodiments, using these phases, a series of data collection engines provided by the platform can extract relevant data about the app, which is then fed to a rules engine. The rules engine extracts relevant data from the information discovered by the other engines for further analysis, processing, and/or as input into an overall risk assessment based on an applicable risk profile.

At 218, an app risk assessment report is generated based on the risk assessment for the analyzed app or a bulk set of apps. In some embodiments, the app risk assessment report is generated for the customer based on a risk profile (e.g., an app risk policy) and general or default reporting requirements. In some embodiments, the app risk assessment report is generated for the customer based on an enterprise risk profile (e.g., enterprise customized app risk policy) and/or customized reporting requirements. In some embodiments, the app risk assessment includes various summary findings as well as supporting data. For example, the app risk assessment can include an app reputation score and/or other relevant or supporting data.

In some embodiments, the app risk assessment report is generated as a HyperText Markup Language (HTML) report. In some embodiments, the app risk assessment report is generated as a JavaScript Object Notation (JSON) report. In some embodiments, the app risk assessment report is generated in a format specified by a custom enterprise profile. For example, ACME Corporation can configure their reports to be automatically generated as a JSON report. As another example, Jane, who is in corporate IT for ACME Corporation, can configure her reports to be provided as HTML reports, and Mary, who is also in corporate IT for ACME Corporation, can configure her reports to be provided as JSON reports. Various other customizations for reporting format and categories of information can also be provided.

As discussed above, the platform for quantifying the risks of apps for mobile devices uses a series of data collection engines (e.g., as shown in FIG. 1) for implementing the phased approach. For example, using the series of data collection engines for collecting various data, such as discussed above, various new rules can be applied to extract interesting behaviors or characteristics in apps for performing a risk assessment of such apps.

In some embodiments, the phased approach facilitates implementing a feedback loop in which information determined during one phase can affect actions performed in a different phase. For example, information learned from a static analysis phase can affect activities performed in a dynamic phase. For example, if the static analysis phase for a given app includes library calls for performing SMS/text messaging, then during the dynamic phase, emulation tests can include attempting to determine whether the app attempts to send any SMS/text messaging and if it does so with or without previously gaining the user's permission to send SMS/text messages. Various other examples for leveraging a feedback mechanism to enhance the efficiency and effectiveness of the phased approach should now be apparent to one of ordinary skill in the art in view of the various embodiments described herein.

For example, in the byte code analysis and decompilation phases, the platform can determine that an individual app sends a text message via seeing SMS APIs used. The platform can also feed this information to the dynamic analysis engine, so that the emulator can watch for the SMS to be sent or can instrument the emulator to send the SMS text. Once the SMS is sent, the platform can record the number the SMS was sent to, and the SMS message itself. At the collective intelligence phase, the SMS number monitored/detected by the dynamic engine can then be compared to a list of SMS numbers used in malware apps that communicate with paid SMS numbers (e.g., a common malware monetization scheme is to use such paid SMS numbers). If a match is found, then the platform can determine that the app should be classified as malware and a report can be provided showing all of the supporting data.

Various examples of app behaviors that impact app riskiness are provided. For example, whether the app is determined to include malware impacts the app risk assessment. In particular, this includes both known malware (e.g., previously identified malware), repackaged malware, new malware used in targeted attacks, and malware behavior.

As another example, whether the app accesses websites/URLs that are unsafe or associated with malware impacts the app risk assessment. In particular, apps that have been observed to download additional (e.g., malicious) content from URLs associated with malware impacts the app risk assessment.

As another example, the platform can apply its own URL "blacklists" or integrate with third party URL blacklist feed providers.

As another example, whether the app accesses SMS numbers that are unsafe or associated with malware impacts the app risk assessment. In particular, a common malware technique is to subscribe a user to an SMS service that will try to steal user data (e.g., phishing attacks).

As another example, whether the app access SMS numbers that are associated with premium (paid) services impacts the app risk assessment. In particular, a common malware technique is to subscribe a user to a premium SMS service, hiding the actual messages from the user but accruing charges (e.g., certain mal-behaving apps can attempt to generate a monetary return for the app developer by sending unauthorized SMS messages, such as using known bad SMS numbers).

As another example, whether the app performs unrequested behaviors (e.g., a mass text to a whole address book, a mass email to a whole address book, an audio or video recording) impacts the app risk assessment.

As another example, what permissions does the app request can be analyzed to determine whether such behavior impacts the app risk assessment (e.g., how do these compare to the average permission count). In particular, malware authors usually take advantage of the difficult to interpret permissions and hide risky behaviors among benign ones to sneak past the user's review process.

As another example, the source of the app (e.g., which market did the app come from) can be analyzed to determine whether such impacts the app risk assessment. In particular, some app markets (e.g., app markets in China and Russia) are known to include higher amounts of malware.

As another example, the developer of the app (e.g., which developer developed the app) can be analyzed to determine whether such impacts the app risk assessment. In particular, some app developers are known for delivering malware or risky apps in the past while others have better reputations.

As another example, the available market data of the app (e.g., app rating, number of downloads, developer's reputation) can be analyzed to determine whether such impacts the app risk assessment.

As another example, whether the app transmits information in clear-text (e.g., without encryption) can be analyzed to determine whether such impacts the app risk assessment.

As another example, whether the app uses encryption for all of its external communication can be analyzed to determine whether such impacts the app risk assessment. In particular, what type of encryption is used and whether the encryption was implemented correctly can be used for such app risk assessment.

As another example, whether the app transmits account user name information (e.g., with or without user permission, and with or without encryption) can be analyzed to determine whether such impacts the app risk assessment.

As another example, whether the app transmits account password information (e.g., with or without user permission, and with or without encryption) can be analyzed to determine whether such impacts the app risk assessment.

As another example, whether the app locally stores account user name information (e.g., with or without user permission, and with or without encryption) can be analyzed to determine whether such impacts the app risk assessment.

As another example, whether the app locally stores account password information (e.g., with or without user permission, and with or without encryption) can be analyzed to determine whether such impacts the app risk assessment.

As another example, whether the app tracks location information (e.g., with or without user permission, and with or without encryption) can be analyzed to determine whether such impacts the app risk assessment. In particular, if the app tracks location information, how does the app track the location (e.g., does the app location track using GPS, using cell tower triangulation, using GeoIP such as using official APIs or using unofficial APIs).

As another example, whether the app attempts to uniquely identify the user of the mobile device can be analyzed to determine whether such impacts the app risk assessment.

As another example, whether the app shares address book or contact information (e.g., with or without user permission, and with or without encryption) can be analyzed to determine whether such impacts the app risk assessment.

As another example, whether the app includes voice recording capabilities/functions can be analyzed to determine whether such impacts the app risk assessment.

As another example, whether the app includes picture and/or video recording capabilities/functions can be analyzed to determine whether such impacts the app risk assessment.

As another example, whether the app reads/writes to removable storage (e.g., a compact flash card or other types of removable storage) can be analyzed to determine whether such impacts the app risk assessment.

As another example, whether the app performs good behavior(s) (e.g., adding secondary Digital Rights Management (DRM) to protect the app and/or added Virtual Private Network (VPN) support for secure communications) can be analyzed to determine whether such impacts the app risk assessment, in which such good behaviors can be used to improve the scoring of the app's risk assessment.

As another example, an app can be blacklisted (e.g., by the platform and/or by a particular enterprise/customer that can identify apps to be blacklisted so that such are not available in the enterprise app store). For example, if a particular app is blacklisted, such as Dropbox (e.g., or another app), then the platform can block any apps that match Dropbox. Also, the platform can also be configured to dynamically extend this rule for blocking Dropbox to also block any apps that use Dropbox based on static analysis, dynamic analysis, and/or other behavior-based analysis and monitoring (e.g., determining which apps use or incorporate the Dropbox SDK, apps that include calls to URLs to Dropbox, etc.).

In some embodiments, an app risk assessment report is generated based on the risk assessment for an analyzed app, such as using the phase-based analysis discussed above. In some embodiments, the app risk assessment report includes various risks and weights per app. In some embodiments, the app risk assessment report can be customized for an enterprise, such as based on an enterprise's custom app risk profile and/or enterprise's custom report profile. For example, a particular enterprise, such as a Fortune 500 company can configure a custom app risk profile that grey lists an app if an iOS app does not use standard Apple terms and conditions (e.g., so that inside legal counsel for a Fortune 500 company can be notified of such app to review their custom terms and conditions to determine whether such are acceptable for use by their employees based on those unique terms and conditions).

Figure 3:
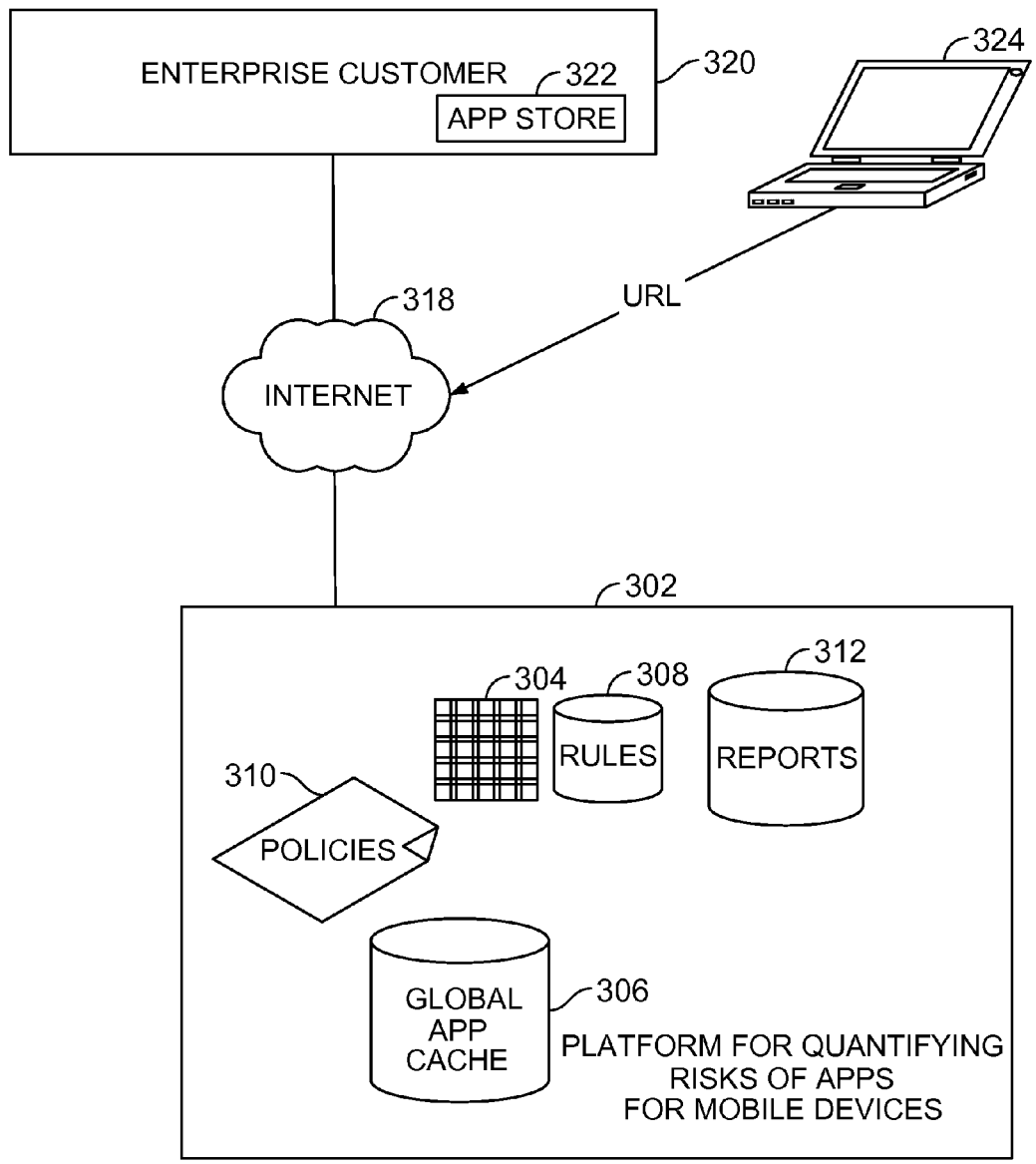
FIG. 3 is another functional block diagram of an architecture for quantifying the risks of apps for mobile devices in accordance with some embodiments.

FIG. 3 is another functional block diagram of an architecture for quantifying the risks of apps for mobile devices in accordance with some embodiments. As shown, a cloud-based platform for quantifying the risks of apps for mobile devices 302 is provided. The platform 302 includes one or more processors 304. In some embodiments, the platform is implemented as a plurality of servers, appliances, virtual machines, and/or combinations thereof. In some embodiments, the platform performs the functions as described above with respect to FIGS. 1 and 2.

As also shown, the platform 302 includes a global app cache 306 for storing previously analyzed apps. The platform 302 also includes policies 310. For example, policies 310 can include various policies for scanning apps for risk assessment (e.g., security policies, privacy policies, device/network integrity policies, etc.). The policies 310 can also include enterprise specific or custom policies, such as custom policies for an enterprise customer 320 (e.g., ACME Corporation), which has an enterprise app store 322 and is in communication with the platform 302 via the Internet 318 as shown. In particular, an authorized user of the enterprise customer (e.g., a corporate IT security admin of ACME Corporation) can access the platform 302 using a device 324 via the Internet 318 (e.g., by securely logging in through a web site, accessed via a URL, such as shown). For example, the authorized user (e.g., a corporate IT team member of ACME Corporation) can configure custom policies, request reports (e.g., individual app reports, bulk app reports, etc.), and/or manage their enterprise account. As also shown, the platform 302 includes various rules 308 for performing various analysis on apps, such as described above with respect to FIG. 2. For example, rules 308 can include various rules (e.g., data and/or executable instructions) that can be processed by the various engines, such as shown in FIG. 1, and applied to perform various app analysis based on an app risk profile, such as implementing the various phases discussed above with respect to FIG. 2.

As also shown, the platform 302 includes a reports data store 312 (e.g., database) for storing reports generated by the platform based on analysis of apps for various users or customers, such as enterprise customer 320. For example, various reports based on apps analysis for ACME Corporation's enterprise app store 322 can be stored in the reports data store. Various reports based on app analysis for other customers or users can also be stored in the reports data store.

Figure 4:
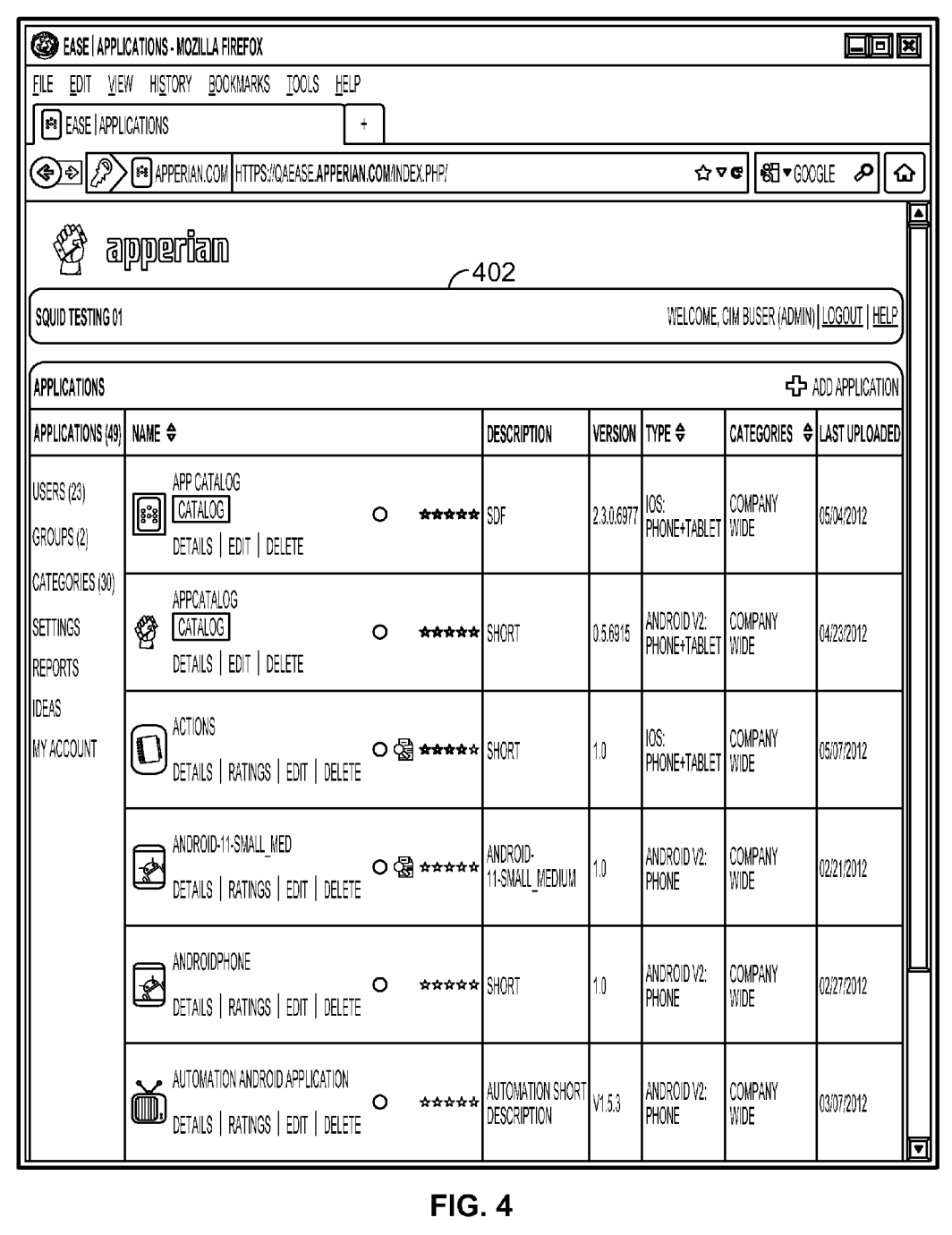

FIG. 4 is a screen diagram of an apps view of a user interface for a platform for quantifying risks of apps for mobile devices in accordance with some embodiments. As shown, the apps view 402 lists various apps that have been analyzed including indicating a star rating for each of the apps, a description of each of the apps, a version of each of the apps, a type for each of the apps, categories for each of the apps, and a date/time for a last upload (e.g., time stamp for when the app was last uploaded to the platform for analysis). As also shown, there are various selectable actions under each, such as Details, Ratings, Edit, and Delete. As also shown, the user interface for the platform includes different views, such as for applications (e.g., as shown in 402, users, groups, categories, settings, reports, Ideas, and My Account).

Figure 5:
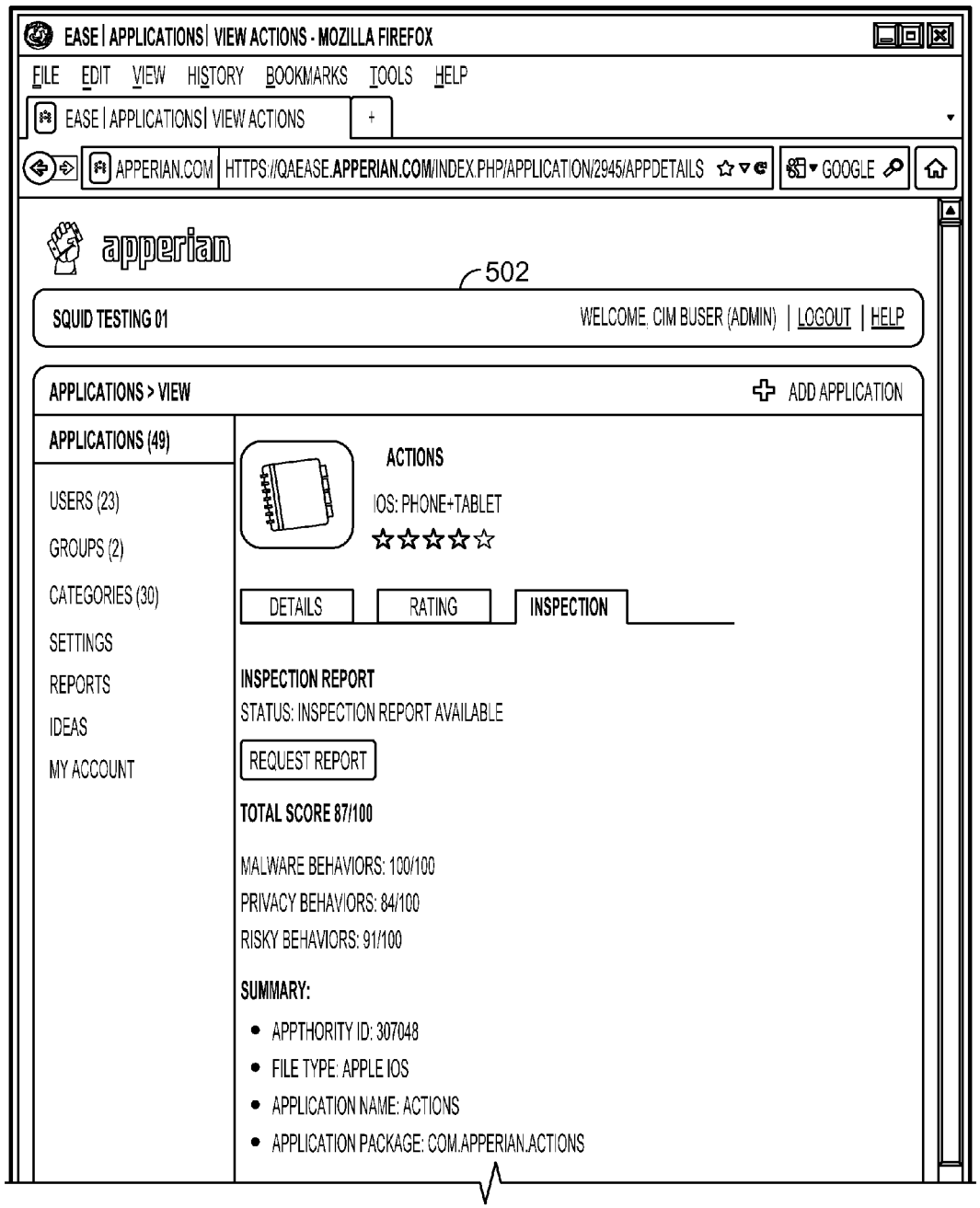
FIG. 5 is a screen diagram of a detailed report for an app analyzed by the platform for quantifying the risks of apps for mobile devices in accordance with some embodiments.

FIG. 5 is a screen diagram of a detailed report for an app analyzed by the platform for quantifying the risks of apps for mobile devices in accordance with some embodiments. In some embodiments, the detailed report 502 is generated by the platform for quantifying risks of apps for mobile devices and can be accessed using a web browser. As shown, the detailed report 502 provides the output of a report generated for an "Actions" app for an iOS phone/tablet, which has been analyzed by the platform and includes a star rating for the app (e.g., 4 stars as shown), with selectable tabs that include Details, Rating, and Inspection. As shown, the Inspection tab is selected and shows the details of the Inspection Report (e.g., reporting a total score of 87/100, including detailed scores for malware behaviors of 100/100, privacy behaviors of 84/100, and risky behaviors of 91/100. As also shown, a summary section is provided, a risky behaviors section is provided, a privacy behaviors section is provided, and a hostname and IP addresses section are provided (e.g., listing reputation information for hostnames and IP addresses that are visited/associated with this app). As would be apparent to one of ordinary skill in the art in view of the various embodiments described herein, various other details and report format and details/information can be provided based on the analysis performed by the platform for quantifying risks of apps for mobile devices as described herein, including based on various user defined customizations (e.g., enterprise customized reporting).

Figure 6:
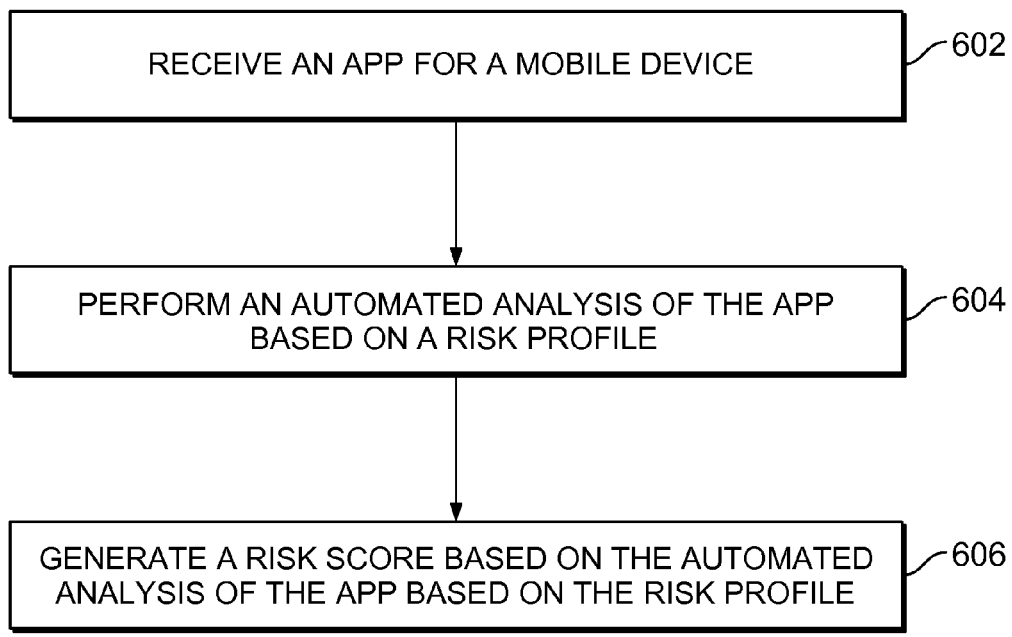
FIG. 6 is a flow diagram for quantifying the risks of apps for mobile devices in accordance with some embodiments.

FIG. 6 is a flow diagram for quantifying the risks of apps for mobile devices in accordance with some embodiments. At 602, an application for a mobile device is received. At 604, an automated analysis of the application based on a risk profile (e.g., using a cloud-based app risk assessment platform/service) is performed. At 606, generating a risk score based on the automated analysis of the application based on the risk profile is performed.

Figure 7:
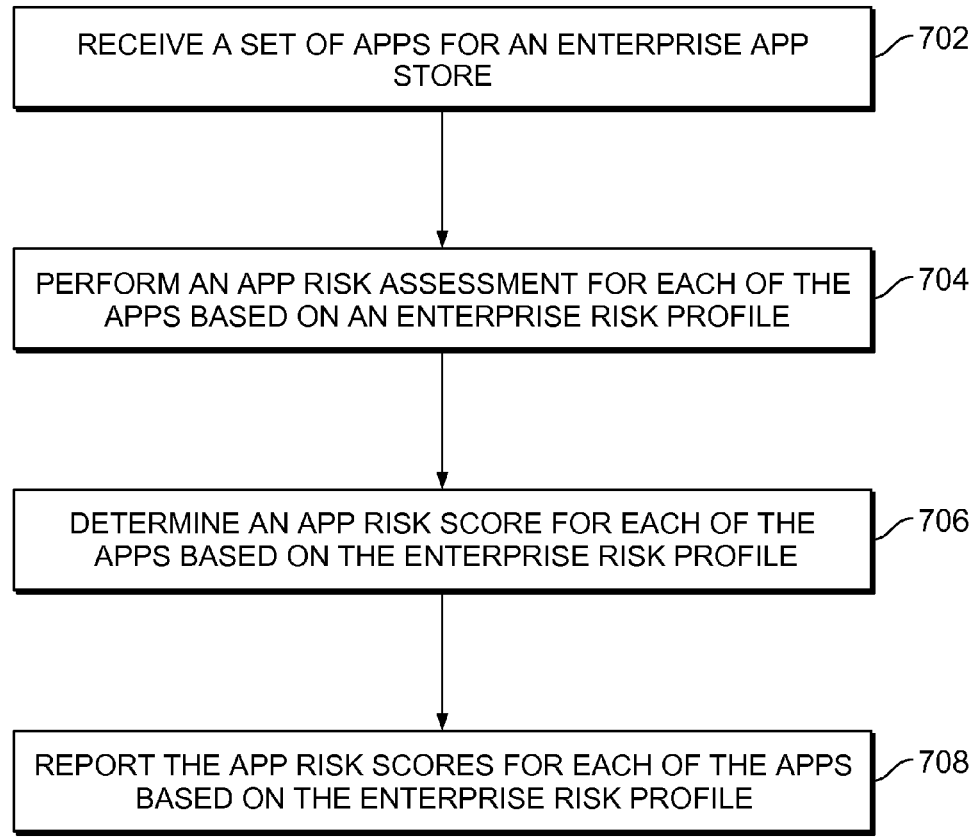
FIG. 7 is another flow diagram for quantifying the risks of apps for mobile devices in accordance with some embodiments.

FIG. 7 is another flow diagram for quantifying the risks of apps for mobile devices in accordance with some embodiments. At 702, a set of apps for an enterprise app store are received. At 704, an automated analysis of each of the apps (e.g., of the set of apps) based on an enterprise risk profile is performed. At 706, determining an app risk score for each of the apps (e.g., of the set of apps) based on the enterprise risk profile is performed. At 708, reporting the app risk scores for each of the apps (e.g., of the set of apps) based on the enterprise risk profile is performed.

For example, using the various techniques described herein, quantifying the risks of apps for mobile devices can be provided by leveraging various mobile application management (MAM) solutions (e.g., enterprise app stores). In particular, MAM solutions, also called "enterprise app stores" store app metadata as well. For example, an enterprise app store (e.g., enterprise app store 118 as shown in FIG. 1) can include or be implemented using a commercially available MAM solution. Example commercially available MAM products in the market today include those sold by Apperian, AppCentral, and other commercial vendors. The typical enterprise app store today has approximately 10 to 50 or more apps inside of it. For example, these apps can be "in-house apps," which are enterprise line of business (LOB) applications for performing a specific task or apps for which the enterprise wants all employees to have access to for installing on their mobile devices (e.g., a sales related app for its sales personnel, and/or other types of apps for all or particular categories of users). In some embodiments, the platform for quantifying the risks of apps for mobile devices similarly supports receiving such store app metadata (e.g., using a bulk query) to identify which apps in the enterprise app store violate a policy (e.g., a malware policy, an enterprise policy, and/or another mobile app policy) using similar techniques as described herein with respect to various embodiments.

In some embodiments, the in-line filtering of insecure or unwanted mobile components or communications (e.g., insecure or unwanted behaviors associated with applications for mobile devices ("apps"), updated versions of apps, communications to/from apps, operating system components/updates for mobile devices, etc.) for mobile devices further includes using an off-device scanner for assessing risks for apps (e.g., for a plurality of different mobile device platforms based on an anti-malware policy that can identify malware risks, privacy risks, and/or other risks or issues associated with apps/app updates, and/or operating system components/updates for mobile devices, etc.). For example, the in-line filtering of apps for mobile devices can use the platform described above with respect to FIGS. 1-7 to provide an off-device scanner (e.g., cloud-based app analysis) for assessing and quantifying risks for apps.

In some embodiments, the in-line filtering of insecure or unwanted mobile device software components or communications can be implemented using a variety of techniques as described herein. For example, various events can be identified (e.g., an app download request, an app update request, an app communication, an update for an operating system/components for mobile devices, etc.), and responsive actions can be performed based on an off-device analysis of the event (e.g., blocking data, such as blocking an app download request, blocking an app update request, blocking an app communication, blocking an update for an operating system/components, etc.).

In some embodiments, the in-line filtering of insecure or unwanted mobile device software components or communications can be implemented by performing in-line filtering at points where networks are connected, or where devices are connected to networks, such as a device responsible for filtering being placed in-line on the network before, after, or in lieu of a routing device, bridging device, access point, cell tower, etc. For example, in-line filtering can be performed on both IP networks and cellular networks, as mobile devices frequently use either or both for communication mediums.

In some embodiments, an in-line filtering device is provided for performing the in-line filtering of insecure or unwanted mobile device software components or communications. In some embodiments, the in-line filtering device includes a physical/hardware appliance or a virtual appliance that can perform in-line filtering as described herein. For example, the in-line filtering device can be implemented as a standalone (e.g., self-contained functionality that includes capabilities for performing the in-line filtering functions). As another example, the in-line filtering device can consume a data feed from a cloud-based app analysis system (e.g., such as described above with respect to FIGS. 1-7 disclosing a cloud-based app analysis system for assessing and quantifying risks for apps). As another example, the in-line filtering device can consume a feed from an air-gapped/private cloud version of the app analysis system (e.g., such as described above with respect to FIGS. 1-7 disclosing a cloud-based app analysis system for assessing risks for apps). Also, in some cases, the data feed that the cloud version or an air-gapped/ private cloud version of the app analysis system can be received in real-time, can be cached, or some other approach can be implemented in terms of exposing the app analysis results data from the app analysis system to the in-line filtering device(s).

In some embodiments, an in-line filtering device is provided for performing the in-line filtering of a known malicious or undesirable app (e.g., based on analysis of the app, including, for example, behaviors performed by the app, by an app analysis system using an app risk policy to profile apps that are analyzed using a variety of static, dynamic, collective app analysis intelligence, and/or other techniques, such as using the various techniques described herein). For example, for mobile devices, apps are typically downloaded from a limited set of public app markets (e.g., official app market places, such as discussed above). For some mobile device platforms, apps can also be retrieved from more traditional locations, such as web sites or e-mail communications. In nearly all cases, apps are transmitted over a network and are not transferred using physical media, such as CD-ROMs or pen drives.

In some embodiments, a cloud-based app analysis system includes findings for known malicious apps available on app markets and/or from other sources. When a mobile device requests an app over the network, an in-line filtering device can intercept the app request. For example, the intercepted app request can be used to check the requested app against a data set (e.g., a data feed, such as discussed above) provided by the app analysis system to determine whether there are known issues affecting the app (e.g., whether the app violates an app risk policy, such as whether the app has been determined to be a known malicious app—associated with or packaged with malware, such as for an app that includes malware or performs undesirable behaviors). If the app is determined to have any such issues (e.g., does not comply with an app risk policy), the app request can be terminated (e.g., as it exits the network or as the response that includes the downloaded app enters the network) and/or some other action(s) can be performed, depending upon a policy configuration, all before the app is returned to and installed on the requesting mobile device. In some cases, if the app request does not match a cached app analysis result or data feed result, then the app associated with the app request can be communicated to a cloud-based app analysis system, which can then dynamically perform an analysis of the app and send back the app analysis results (e.g., the app request and/or response to the app request can be queued/quarantined pending the results being sent back to verify whether or not to allow the app request to proceed or to perform some other action). Accordingly, using various techniques described herein, an app request and/or response to the app request can be intercepted to prevent downloading and installing an undesirable app using a cloud-based app analysis system and in-line filtering (e.g., an in-line filtering device), as described further below with respect to FIGS. 8, 9, and 10. For example, the in-line filtering device can also pass entity or user properties associated with the app request to the app analysis system. In particular, entity or user properties associated with the app request can include, for example, the origin network address and other identifying properties that are included in the app request.

Figure 8:
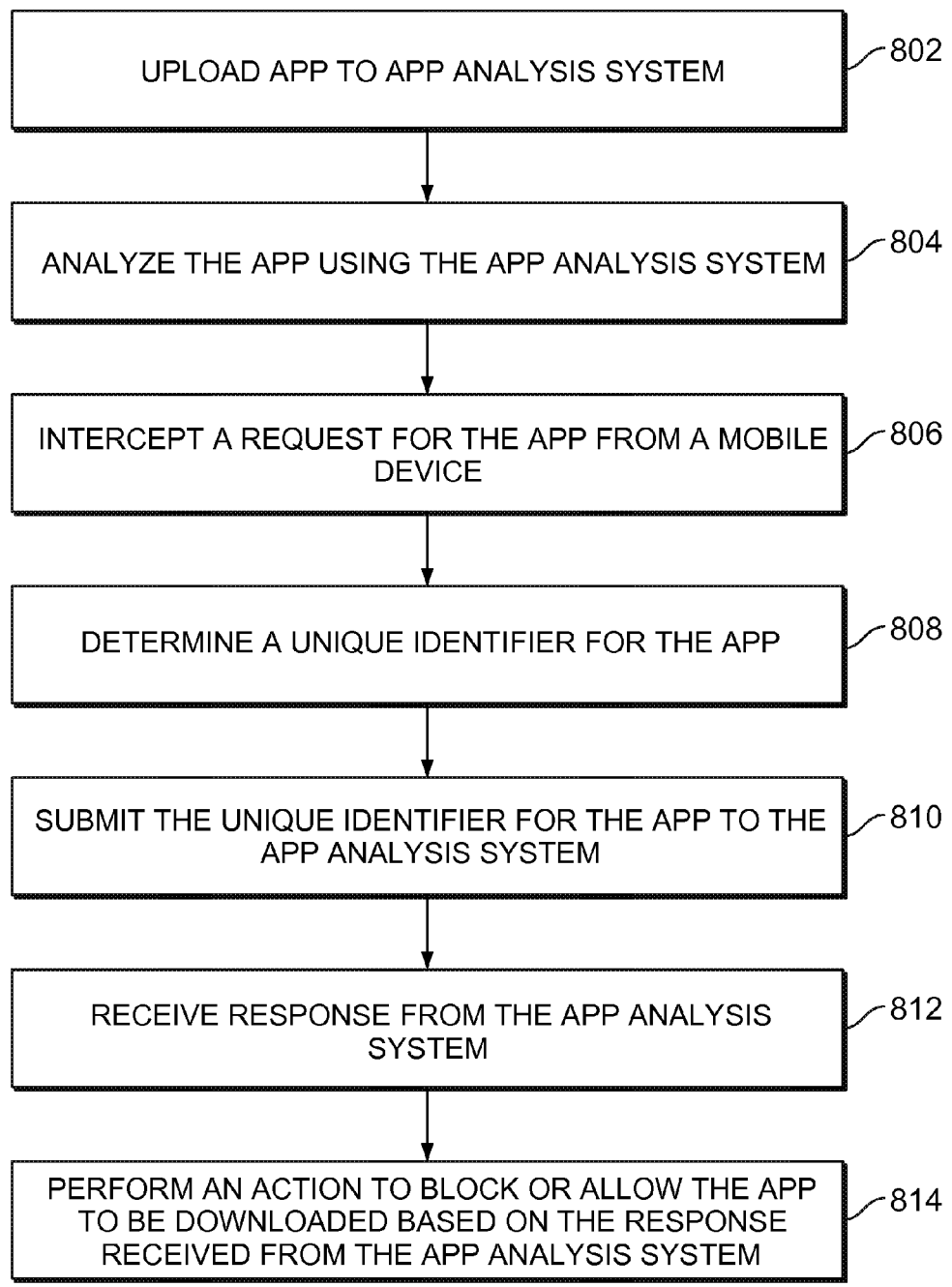
FIG. 8 illustrates a flow diagram for in-line filtering of apps for mobile devices in accordance with some embodiments.

FIG. 8 illustrates a flow diagram for in-line filtering of apps for mobile devices in accordance with some embodiments. For example, the in-line filtering of insecure or unwanted mobile device software components or communications (e.g., apps and/or updated versions of apps for mobile devices) can be implemented using an end-to-end process as shown in FIG. 8 and as described below. At 802, an app is uploaded (e.g., new apps and new versions of apps can be automatically uploaded from public app stores based on a periodic monitoring of apps available in such app stores) to an app analysis system (e.g., such as the app analysis system as described above with respect to FIGS. 1-7 or a similar app analysis system capable of determining whether the app complies with an app risk policy based on attributes and/or behaviors, which can be implemented as a cloud-based app analysis system). At 804, the app is analyzed using the app analysis system. For example, the app can be analyzed once it is uploaded and findings related to malware, security, privacy, and/or other issues can be stored. In some cases, the app was previously uploaded to and analyzed by the app analysis system. In some cases, the app analysis system periodically checks public app stores for new apps and/or new versions of apps, automatically uploads such apps/new versions of apps, performs the automated analysis of such apps/new versions of apps, stores the results of the analysis of such apps/new versions of apps, such that the results of the analysis of such apps can be provided upon request and/or as a data feed (e.g., to subscribers, including to in-line filtering devices or as components for app analysis systems in communication with in-line filtering devices), such as described herein.

At 806, an in-line filtering device intercepts a request for an app (e.g., an app request) from a mobile device (e.g., such as an app request directed to an app store, such as a public app store, a web site, or another app source). At 808, the in-line filtering device determines a unique identifier for the app. In some embodiments, a unique identifier for the app is determined (e.g., calculated) using various techniques, such as described below.

For example, the request can be allowed to proceed, so that the app can be received in response to the app request, and a unique identifier can be calculated based on the received app. In this example, the unique identifier can be calculated as a hash of the app file (e.g., using a hashing algorithm such as discussed above, to generate a unique value calculated based on the app file), or some other value can be calculated using/based on the received app. In this example, the app can be cached/quarantined by the filtering device, or partially held (e.g., throttle a download of the app), such that the complete content of the app is not allowed to fully transfer to the mobile device in this scenario pending results of the analysis of the app being received and evaluated (e.g., based on a policy). Thus, in this example, the hash of the app (e.g., or some other value can be calculated using/based on the received app) can be used as the unique identifier of the app.

As another example, a unique identifier can be determined by extracting information transmitted in the app request. In some cases, the request includes a hash of the app (e.g., embedded within a URL/URI of the app request). In such cases, such a hash value can be extracted to be used as the unique identifier. In some cases, other information can be extracted from the app request to be used as a unique identifier. For example, an app request for an iOS app from the Apple app store is in the form of a URL/URI that can be parsed to extract information that can be used as the unique identifier (e.g., an app request for Angry Birds Star Wars from a web browser results in the following URL/URI: https://itunes.apple.com/us/app/angry-birds-star-wars/id557137623?mt=8&ign-mpt=uo %3D2). In this example, the title of the app can be extracted from the URL/URI (e.g., Angry Birds Star Wars) and the App ID number can be extracted from the URL (e.g., 557137623), which can be used to verify the app risk analysis for this app based on the App ID provided as a unique identifier for the app (e.g., correlated based on that App ID number as a unique identifier for this iOS app). Similarly, download requests for apps in other app stores can also be analyzed, such as for Android apps from the Google Play app store, in which such a search for Angry Birds Star Wars from a web browser results in the following URL/URI: https://play.google.com/store/apps/details?id=com.rovio.angrybirdsstarwars.ads.iap&feature=search_result#?t=W251bGwsMSwyLDEsImNvbS5yb3Zpby5hbmdyeWJpcmRzc3RhcndhcnMuYWRzLmlhcCJd). In this example, the app name (e.g., Angry Birds Star Wars) and a unique ID (e.g., W251bGwsMSLDEsImNvbS5yb3Zpby5hbmdyeWJpcmRzc3RhcndhcnMuYWRzLmlhcCJd) can similarly be extracted from this app request to the Google Play app store, and which can similarly then be used to verify the app risk analysis for this app based on this unique ID provided as a unique identifier for the app (e.g., correlated based on that unique ID for this Android app).

At 810, the unique identifier for the app is submitted to the app analysis system. The app analysis system can use the unique identifier to attempt to match existing data and can then respond indicating whether the app is known to have issues or not (e.g., violates an aspect of an app risk policy, such as described herein with respect to various embodiments). For example, the in-line filtering device can submit the determined unique identifier for the app associated with the app request to the app analysis system. The app analysis system can attempt to correlate the unique identifier with cached or previously determined app analysis results for the app that corresponds to the unique identifier. If a match is determined, then the previously determine app analysis results can be provided in response to the in-line filtering device. In some cases, a match is not determined (e.g., the app was not previously analyzed by the app analysis system or that version of that app was not previously analyzed by the app analysis system). In such cases, the app analysis system can dynamically upload the app (e.g., from the app store and/or from the in-line filtering device, or another source), perform the app analysis on the uploaded app, and then provide the app analysis results to the in-line filtering device.

At 812, a response is received from the app analysis system. For example, the in-line filtering device receives the response from the app analysis system. The response can indicate whether the app is known to have issues or not (e.g., violates an aspect of an app risk policy, such as described herein with respect to various embodiments). In some cases, the response can indicate that the app does not match any previously cached app analysis results. In some cases, the response can further include newly generated app analysis results for the app. In some embodiments, the response includes an app analysis report, such as described herein with respect to various embodiments. For example, the app analysis report can be used by the filtering device to automatically provide more information concerning the risks associated with the app as determined by the app analysis system, which can be reported to IT and/or a user of the mobile device.

In some embodiments, a data feed is received by the in-line filtering device from the app analysis system, such that the in-line filtering device can determine whether it has already received the app analysis system results for the app based on information provided in the data feed using the unique identifier to correlate with previous app analysis scanning results supplied in the data feed. If not, then the in-line filtering device can query the app analysis system based on the unique identifier using the various techniques described herein (e.g., an app query for or a bulk app query can be communicated to the cloud-based app analysis system).

At 814, the in-line filtering device can perform an action based upon the response received from the app analysis system. For example, the in-line filtering device can be configured to block the transfer (e.g., prevent the complete download) of the requested app to the mobile device if the app is known to be malicious (e.g., was determined by the app analysis system to be malicious, such as including malware or violating some other aspect of a malware policy) and/or to have other issues of concern. As another example, the in-line filtering device can be configured to quarantine the app for further analysis, for IT approval for an entity associated with the mobile device, for approval by a user of the mobile device after acknowledgement of potential threats associated with the app are presented in a display on the mobile device to the user, and/or some other action(s) can be performed based on various configurations.

In some embodiments, the in-line filtering of insecure or unwanted mobile device software components or communications is implemented to filter traffic for app requests from various devices, not just mobile devices. For example, the filtering device (e.g., in-line filtering device) can also apply filtering logic to apps transferred over the network by other kinds of devices. For example, if a desktop Apple iTunes® client executing on a desktop computer is used to purchase and download a mobile app, the filtering device can apply the same logic to block the download of the app to that desktop computer. In other words, an app can be blocked any time it is transferred over the network, if it is known to have issues and not only when requested for download by a mobile device.

Figure 9:
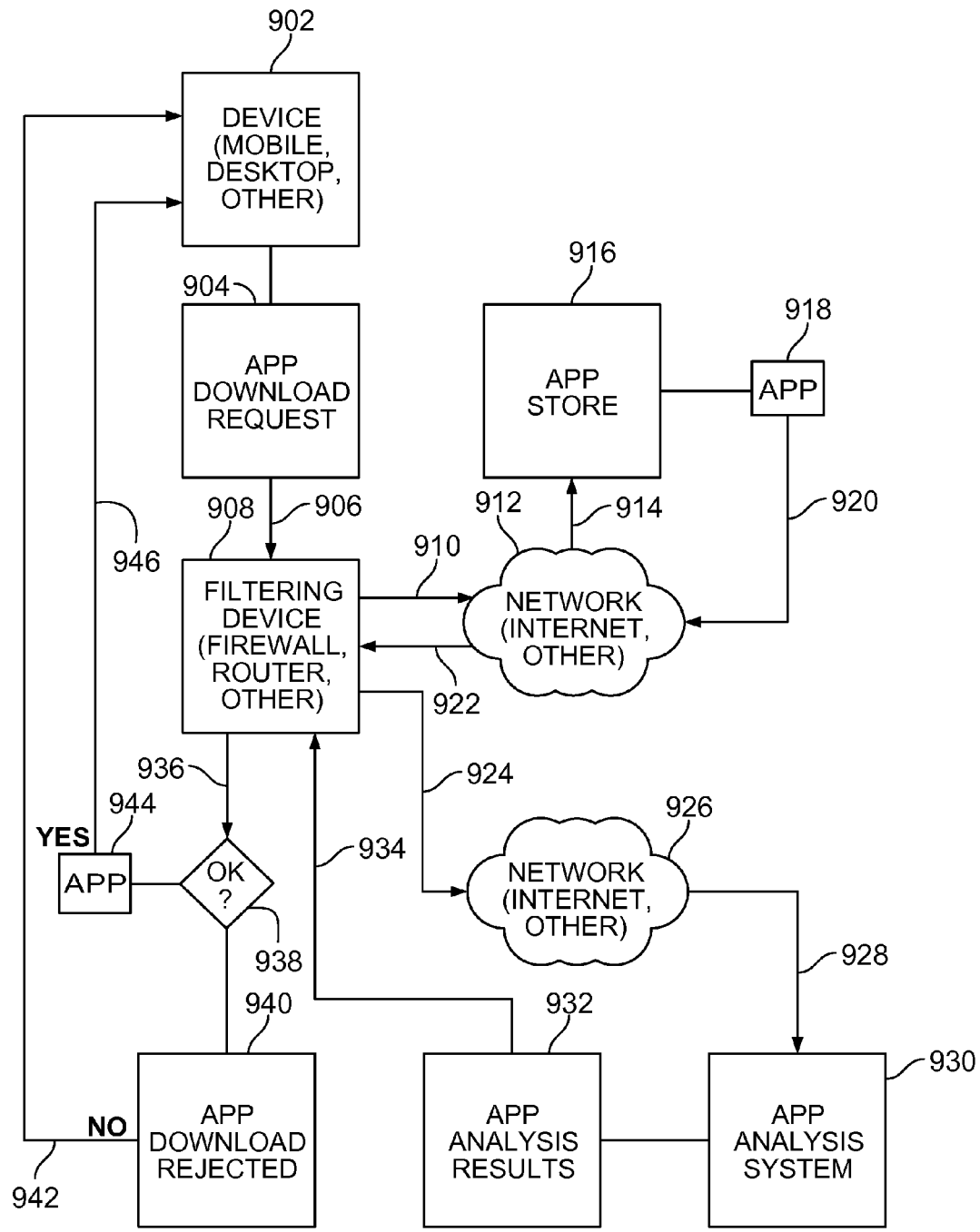
FIG. 9 illustrates a functional block diagram of an architecture for in-line filtering of apps for mobile devices after receiving downloaded apps in accordance with some embodiments.

FIG. 9 illustrates a functional block diagram of an architecture for in-line filtering of apps for mobile devices after receiving downloaded apps in accordance with some embodiments. In particular, FIG. 9 illustrates an example of in-line filtering of apps based on app analysis by an app analysis system after receiving an app (e.g., and a unique identifier for the app) from the filtering device. As shown, a device 902 (e.g., a mobile device, a desktop device, and/or another type of user device) sends an app download request 904 that is intercepted at 906 by a filtering device 908 (e.g., an in-line filtering device, such as a gateway, security appliance (such as a firewall appliance that can be integrated with other security components, such as IDS/IPS, DLP, VPN, etc.), router, or another type of in-line filtering device). The app download request is forwarded by the filtering device 908 at 910 to a network 912 (e.g., the Internet, and/or other networks, such as IP networks and/or cellular networks), which is then communicated at 914 to an app store 916. The app 918 is downloaded from the app store 916 at 920 over the network 912 at 922 to the filtering device 908.

In some embodiments, the filtering device 908 identifies the app download request 904 and determines a unique identifier for the app, such as using one or more of the techniques described herein (e.g., calculating a unique value based on the downloaded app 918). The filtering device 908 communicates the unique identifier for the app at 924 to a network 926 (e.g., the Internet, and/or other networks, such as IP networks and/or cellular networks), which is then communicated at 928 to an app analysis system 930. As discussed above, the app analysis system 930 determines whether it has results for the app based on the unique identifier and provides any such app analysis results 932 at 934 to the filtering device 908. In some cases, as shown at 936, the filtering device 908 determines at 938 whether or not the app should be permitted for download to the client device 902 based on the app analysis results 932. If the app is not permitted for download to the client device 902 based on the app analysis results 932, then the app download is rejected at 940 as communicated to the device 902 at 942 (e.g., a notification can be communicated to the device 902 informing the user that the app cannot be downloaded due to the app analysis for the app and an app risk profile associated with the device). Otherwise, the app 944 is downloaded at 946 to the device 902 as shown.

In some embodiments, the in-line filtering device receives the app analysis results 932 and then applies such results to a custom app risk profile to determine whether the app is a risk or not, and/or to determine what action to perform based on the app risk analysis based on the app analysis results 932 and app risk profile. For example, the filtering device can be used to protect an enterprise network, such as for the ACME Corporation. IT for ACME Corporate can configure a custom enterprise profile for app risks that can specify one or more criteria for apps that can or cannot be downloaded to devices via the enterprise network for the ACME Corporation. In this example, if the ACME Corporation has an app risk profile that prohibits downloading of apps associated with known malware, then if Bob, who is an employee of ACME Corporation, attempts to download (e.g., over the ACME Corporation Wi-Fi, wired network, etc.) a new gaming app that has been packaged with known malware to his Android tablet, then Bob's app download request can be denied using the techniques described above with respect to FIG. 9.

In some embodiments, if the app analysis system 930 determines that it does not already have app analysis results previously determined (e.g., cached or otherwise stored) for the app based on the unique identifier (e.g., if no such analysis has previously been performed for the app by the app analysis system, or if the analysis should be updated, based on a last time of analysis/scanning of the app, based on new rules or analysis available to perform on the app, and/or based on other events, criteria, and/or configuration settings/parameters), then the app analysis system can be configured to dynamically download and analyze the app in response to this app query. In some embodiments, the filtering device 908 identifies a request to download an app (e.g., an app request). The filtering device 908 submits the app to an app analysis component (e.g., an app analysis engine, such as the app analysis system) capable of analyzing the app. The app analysis component can reside on the filtering device or on another separate system on the same network, and/or in the cloud (e.g., the app analysis system 930). The app analysis component is responsible for identifying any malware, security, privacy, behaviors, or other similar related issues associated with the app. The app analysis component is responsible for storing the results of such app analysis (e.g., caching the app analysis results to speed future responses to queries for app analysis for that particular app/version of that app), and for returning the results of the app analysis to the filtering device 908. As similarly discussed above, the filtering device 908 can perform an action(s) based upon the response received, such as blocking a transfer (e.g., download) of the app, allowing the transfer of the app, and/or some other action(s).

Figure 10:
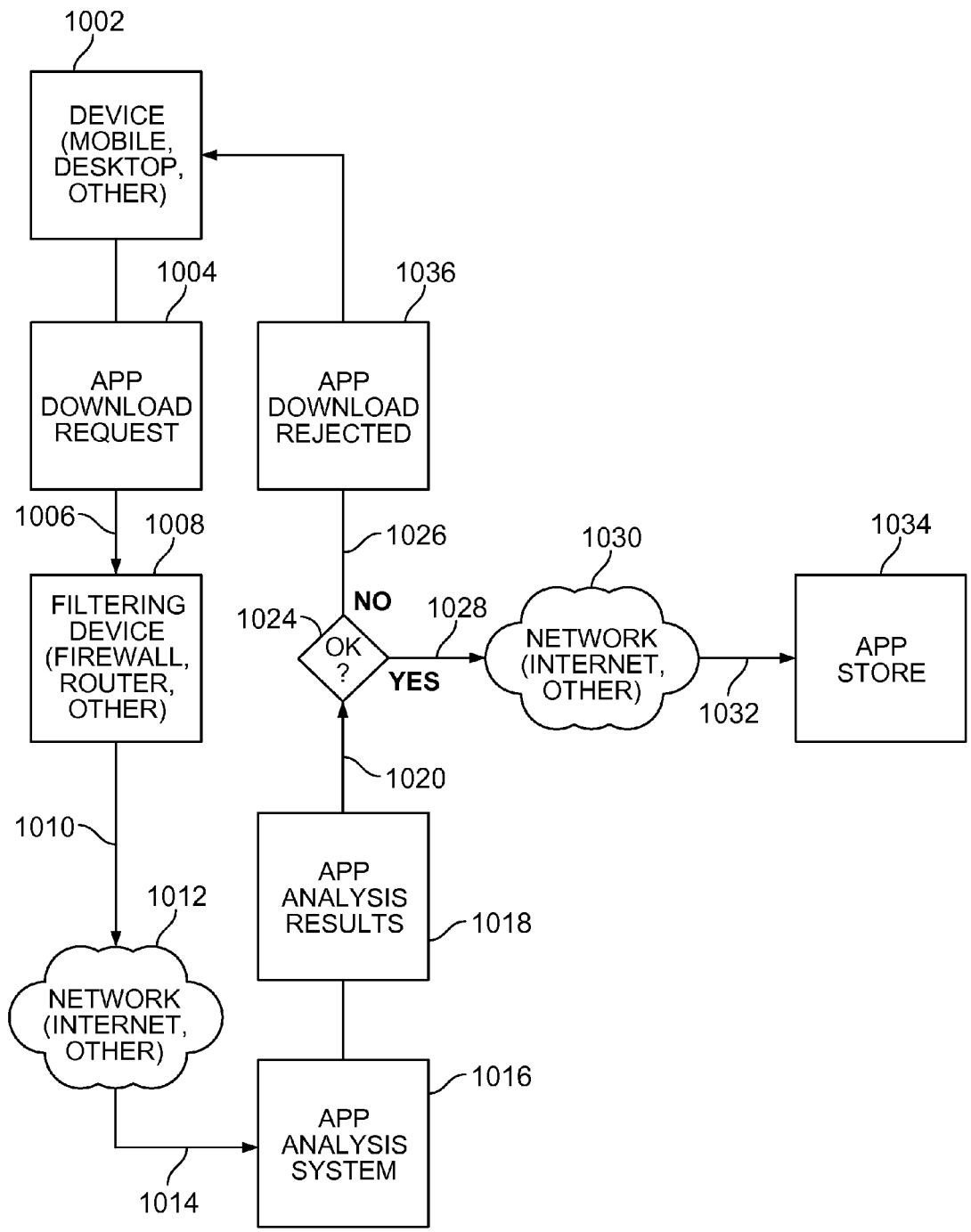
FIG. 10 illustrates a functional block diagram of an architecture for in-line filtering of apps for mobile devices before downloading requested apps in accordance with some embodiments.

FIG. 10 illustrates a functional block diagram of an architecture for in-line filtering of apps for mobile devices before downloading requested apps in accordance with some embodiments. In particular, FIG. 10 illustrates an example of in-line filtering of apps based on app analysis by an app analysis system before allowing the app request to be downloaded from an app store. As shown, a device 1002 (e.g., a mobile device, a desktop device, and/or another type of user/client device) sends an app download request 1004 that is intercepted at 1006 by a filtering device 1008 (e.g., an in-line filtering device, such as a gateway, security appliance (such as a firewall appliance that can be integrated with other security components, such as IDS/IPS, DLP, VPN, etc.), router, or another type of in-line filtering device). The app download request is forwarded by the filtering device 1008 at 1010 to a network 1012 (e.g., the Internet, and/or other networks, such as IP networks and/or cellular networks), which is then communicated at 1014 to an app analysis system 1016. In some embodiments, the filtering device 1008 identifies the app download request 1004 and determines a unique identifier for the app, such as using one or more of the techniques described herein. For example, the filtering device 1008 can communicate the unique identifier for the app at 1010 to network 1012, which is then communicated at 1014 to an app analysis system 1016. As discussed above, the app analysis system 1016 determines whether it has results for the app based on the unique identifier and provides any such app analysis results 1018 at 1020 to the filtering device 1008. As similarly discussed above with respect to FIG. 9, if the app has not been previously analyzed (e.g., or if the analysis should be updated, based on a last time of analysis/scanning of the app, based on new rules or analysis available to perform on the app, and/or based on other events, criteria, and/or configuration settings/parameters), then the app can be dynamically uploaded and analyzed to generate new/updated app analysis results to provide to the filtering device 1008. As shown, the filtering device 1008 determines at 1024 whether or not the app should be permitted for download to the client device 1002 based on the app analysis results 1018. If the app is not permitted for download to the client device 1002 based on the app analysis results 1018, then the app download is rejected at 1036 as communicated to the device 1002 at 1026 (e.g., a notification can be communicated to the device 1002 informing the user that the app cannot be downloaded due to the app analysis for the app and an app risk profile associated with the device). Otherwise, the app download request is transmitted at 1028 to a network 1030 (e.g., the Internet, and/or other networks, such as IP networks and/or cellular networks), which is then communicated at 1032 to an app store 1034. For example, at this point, the requested app can then be downloaded from the app store 1034 over the network 1030 to the filtering device 1008 and then downloaded to the device 1002 (e.g., on which the app can be installed after the app download is completed).

In some embodiments, the in-line filtering device 1008 receives the app analysis results 1018 and then applies such results to a custom app risk profile to determine whether the app is a risk or not, and/or to determine what action to perform based on the app risk analysis based on the app analysis results 1018 and app risk profile. For example, the filtering device can be used to protect an enterprise network, such as for the ACME Corporation. IT for ACME Corporate can configure a custom enterprise profile for app risks that can specify one or more criteria for apps that can or cannot be downloaded to devices via the enterprise network for the ACME Corporation. In this example, if the ACME Corporation has an app risk profile that prohibits downloading of apps associated with known malware, then if Bob, who is an employee of ACME Corporation, attempts to download (e.g., over the ACME Corporation Wi-Fi, wired network, etc.) a new gaming app that has been packaged with known malware to his Android tablet, then Bob's app download request can be denied using the techniques described above with respect to FIG. 10.

Figure 11:
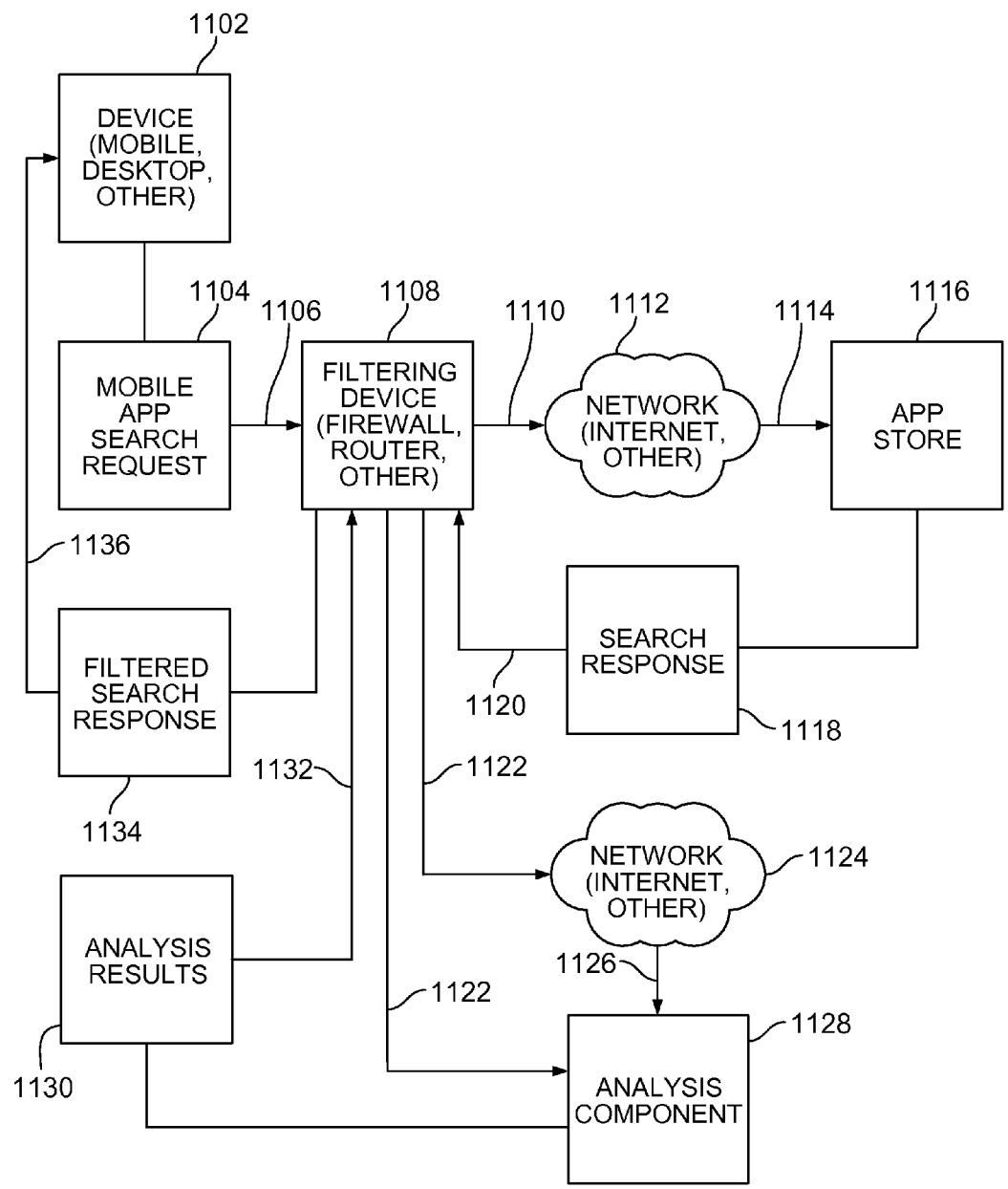
FIG. 11 illustrates a functional block diagram of an architecture for in-line filtering of app market search results for mobile devices in accordance with some embodiments.

FIG. 11 illustrates a functional block diagram of an architecture for in-line filtering of app market search results for mobile devices in accordance with some embodiments. In particular, FIG. 11 illustrates an example of in-line filtering of app market search results based on app analysis by an app analysis component after receiving a mobile app search request from the filtering device to facilitate in-line filtering of marketplace searches for insecure or unwanted apps.

As shown, a device 1102 (e.g., a mobile device, a desktop device, and/or another type of user device) sends a mobile app search request 1104 that is intercepted at 1106 by a filtering device 1108 (e.g., an in-line filtering device, such as a gateway, security appliance (such as a firewall appliance that can be integrated with other security components, such as IDS/IPS, DLP, VPN, etc.), router, or another type of in-line filtering device). The mobile app search request is forwarded by the filtering device 1108 at 1110 to a network 1112 (e.g., the Internet, and/or other networks, such as IP networks and/or cellular networks), which is then communicated at 1114 to an app store 1116. At 1118, the app store 1116 sends a search response 1118 (e.g., a list of apps returned by the app store in response to the mobile app search request), which is returned to the filtering device 1108 at 1120. At 1122, the filtering device 1108 sends the search response 1118 to an analysis component 1128. As shown, the analysis component 1128 can be integrated or local to the filtering device 1108 or can be implemented as a cloud-based service (e.g., a cloud-based app analysis system, such as described herein with respect to various embodiments) communicated to via a network 1124 (e.g., the Internet, and/or other networks, such as IP networks and/or cellular networks) as shown at 1122 and 1126. In some embodiments, the analysis component 1128 identifies each app in the search response 1118. In some embodiments, the filtering device 1108 parses the search response 1118 to identify the apps included in the app store search results and then to generate a bulk app query that specifies each of those identified apps, in which the bulk app query is communicated to the analysis component 1128. In some embodiments, an API is provided that supports app store search results, such as search response 1118, to be specified for parsing and app analysis of identified apps by the app analysis component 1128. As shown, the analysis component 1128 generates app analysis results 1130 for each app in the search response 1118 (e.g., using various techniques described herein, including based on cached and/or dynamically generated new app analysis results for one or more of the app identified in the app search response 1118). At 1132, the analysis results 1130 are communicated to the filtering device 1108. Based on the analysis results 1130 (e.g., and possibly an app risk policy, such as an enterprise configured app risk policy), the filtering device 1108 generates a filtered search response 1134 that is communicated to the device 1102 as shown at 1136. For example, the filtered search response 1134 can include all or a subset of the apps identified in the search response 1118 based on the analysis results 1130 and/or other information (e.g., such as warnings regarding risks associated with one or more apps identified in the app search results included in or filtered out of apps listing included in the filtered search response 1134).

For example, assume that a user of the device 1102 is Bob, who is an employee of ACME Corporation and using ACME Corporation's corporate network to perform app market searches, and ACME Corporation implements a filtering device 1108 for their corporate network(s) to facilitate in-line filtering of marketplace searches for insecure or unwanted apps. If Bob searches a market place for an app using ACME Corporation's corporate network (e.g., the ACME Corporation Wi-Fi, wired network, etc.), then the search results can be modified to indicate that an app is known to have issues, or can be removed from the app search results entirely, if one or more of the apps in the app search results fail to comply with an app risk policy configured for ACME Corporation. Such responsive action(s) can be performed to alert the user, in this case, Bob, or to prevent the user from downloading and installing such insecure or unwanted app(s). In this scenario, the filtering device 1108 identifies an app search request, receives the app search results, and then identifies a list of apps returned in the results. This list of apps is submitted to an analysis component 1128 (e.g., the app analysis system, such as described herein), and a response is received for, at least, all apps known to have issues. The filtering system then modifies the response, possibly highlighting issues, removing some content, and/or performing some other action(s) based on a configuration policy. For example, if Bob performs a search for Angry Birds for the Android platform, then the app search results would typically return multiple versions of Angry Birds (e.g., Angry Birds Space, Angry Birds Star Wars, etc.). However, if any of those versions of Angry Birds were determined to have been repackaged with malware or other undesirable content/functionality, then the filtering device can remove such apps from the apps results listing (e.g., and can possibly also include a warning notifying Bob that such apps were removed from the search results apps listing and the reasons for their removal).

Figure 12:
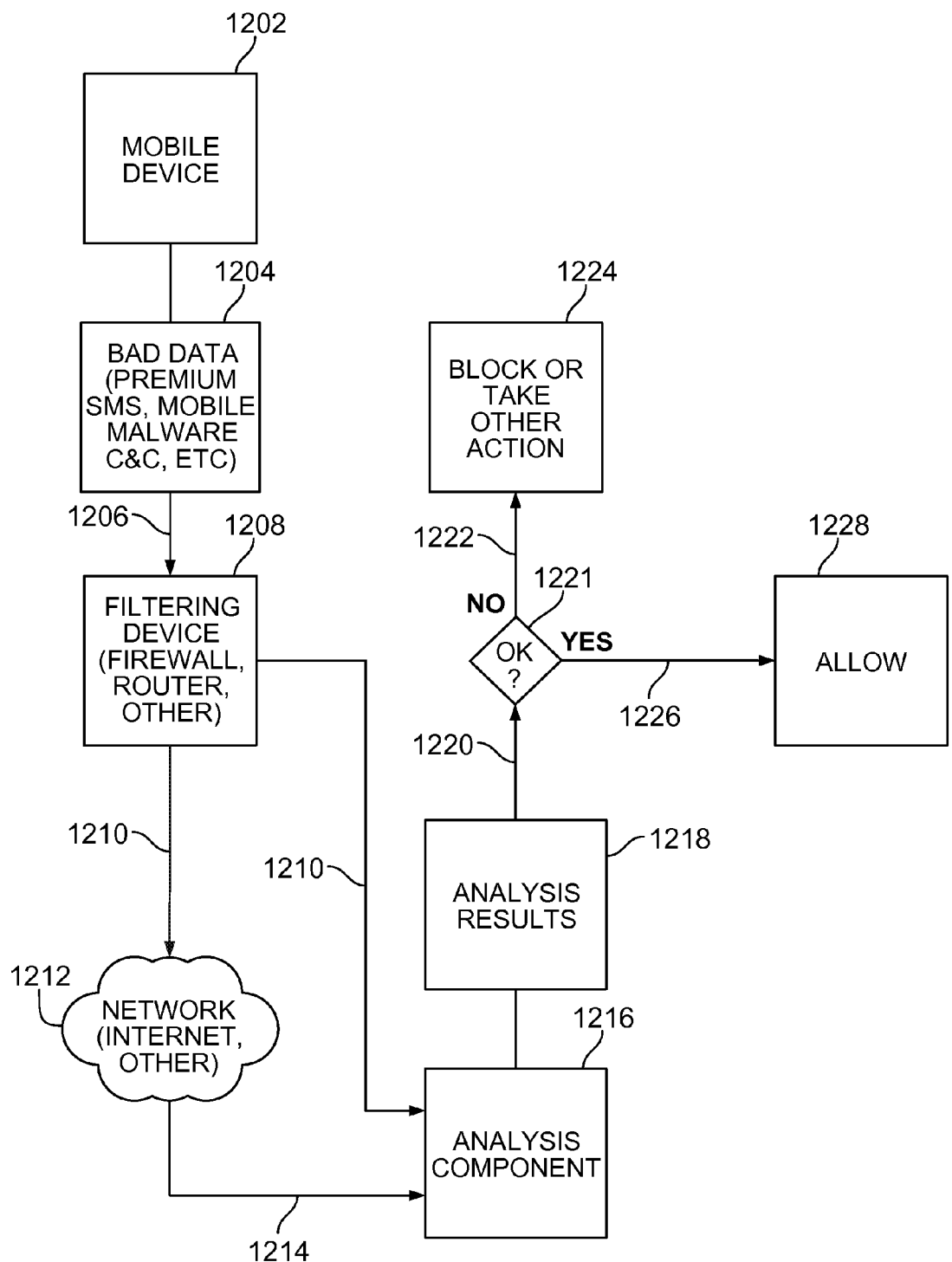
FIG. 12 illustrates a functional block diagram of an architecture for in-line filtering of insecure or unwanted mobile device communications in accordance with some embodiments.

FIG. 12 illustrates a functional block diagram of an architecture for in-line filtering of insecure or unwanted mobile device communications in accordance with some embodiments. In particular, FIG. 12 illustrates an example of in-line filtering of insecure or unwanted mobile device communications using the filtering device to facilitate in-line filtering of unwanted mobile device communications.

As shown, a device 1202 (e.g., a mobile device) sends mobile device communication data 1204 (e.g., bad data that is associated with insecure or unwanted mobile device communications) that is intercepted at 1206 by a filtering device 1208 (e.g., an in-line filtering device, such as a gateway, security appliance (such as a firewall appliance that can be integrated with other security components, such as IDS/IPS, DLP, VPN, etc.), router, or another type of in-line filtering device). The mobile device communication data is forwarded by the filtering device 1208 at 1210 to an analysis component 1216. As shown, the analysis component 1216 can be integrated or local to the filtering device 1208 or can be implemented as a cloud-based service (e.g., a cloud-based app analysis system, such as described herein with respect to various embodiments) communicated via a network 1212 (e.g., the Internet, and/or other networks, such as IP networks and/or cellular networks) as shown at 1210 and 1214. In some embodiments, the analysis component 1216 identifies bad data that is associated with insecure or unwanted mobile device communications in the mobile device communication data 1204 and generates analysis results 1218 (e.g., identifying such mobile device communication data 1204 as being associated with insecure or unwanted mobile device communications, and in some cases, identifying one or more apps installed on the mobile device 1202 associated with such insecure or unwanted mobile device communications, using various techniques described herein). At 1220, the analysis results 1218 are allowed, blocked, and/or some other action is performed as shown (e.g., depending on an app risk policy as applied to the analysis results). In some cases, as shown at 1221, based on the analysis results 1218 (e.g., and possibly an app risk policy, such as an enterprise configured app risk policy), at 1222, the filtering device 1208 determines that the mobile device communication data is associated with insecure or unwanted mobile device communications, and as shown at 1224, the filtering device 1208 blocks the mobile device communication(s) or performs other responsive action(s). In some cases, as shown at 1221, based on the analysis results 1218 (e.g., and possibly an app risk policy, such as an enterprise configured app risk policy), at 1226, the filtering device 1208 determines that the mobile device communication data is not associated with insecure or unwanted mobile device communications, and as shown at 1228, the filtering device 1208 allows the mobile device communication(s).

Mobile devices can generate insecure or unwanted data while connected to a network (e.g., an enterprise network, an IP network, a cellular network, and/or other network(s)). For example, an app installed on a mobile device can be malicious and can attempt to send a premium SMS message, can attempt to send sensitive data such as the address book or any other data of value without adequate authorization to a remote network. For example, assume that a user of the device 1202 is Bob, who is an employee of ACME Corporation and uses ACME Corporation's corporate network to perform mobile device communications, and ACME Corporation implements a filtering device 1208 for their corporate network(s) to facilitate in-line filtering of insecure or unwanted mobile device communications. In this scenario, the filtering device 1208 identifies transmission of insecure or unwanted mobile device-specific data from/to Bob's mobile device 1202, and can perform responsive action(s) accordingly. For example, if Bob's mobile device is connected to the ACME Corporation network, and it attempts to send insecure or unwanted mobile device communications (e.g., a premium SMS message to a known bad SMS number, or other insecure or unwanted mobile device communications), then the filtering device can identify the attempt to insecure or unwanted mobile device communications (e.g., a message content and a destination for the premium SMS message to the known bad SMS number) and can perform a responsive action(s), such as alerting the user or carrier, blocking the message, and/or some other action(s). As will now be apparent to one of ordinary skill in the art in view of the various embodiments disclosed herein, there are a number of other events that can be detected by the filtering device 1208 including, for example, transmission of GPS coordinates, address book contents, sensitive banking details potentially extracted from a database file used by an app, and various other events/content that can be associated with insecure or unwanted mobile device communications. Once such insecure or unwanted mobile device communications are detected, then the filtering device can perform various corrective and/or responsive action(s) based upon a configuration policy (e.g., a policy can be configured based on an enterprise associated with the network, associated with the mobile device, and/or associated with the user).

For example, rules can be used to identify particular events that can be exported from the app analysis system (e.g., an app analysis component or cloud-based app analysis system) in a format suitable for use by the filtering device, in a manner such as similarly discussed above with respect to various embodiments. These rules can include, for example, rules for the following: detection of known risky SMS numbers; detection of known risky apps (e.g., APKs, IPAs, etc.); detection of known risky app components (e.g., DEX files, executables, etc.); detection of known risky URL/URI or hostname or IP address or e-mail address, and other information; ability to detect known risky DRM and non-DRM protected apps (e.g., in particular, in the case of Apple iOS® apps); and detection of bot-net command and control (C&C) channels. For the above listed rules, data used for identification and blocking can be provided by an app analysis system to the filtering device using the various techniques described herein.

Figure 13:
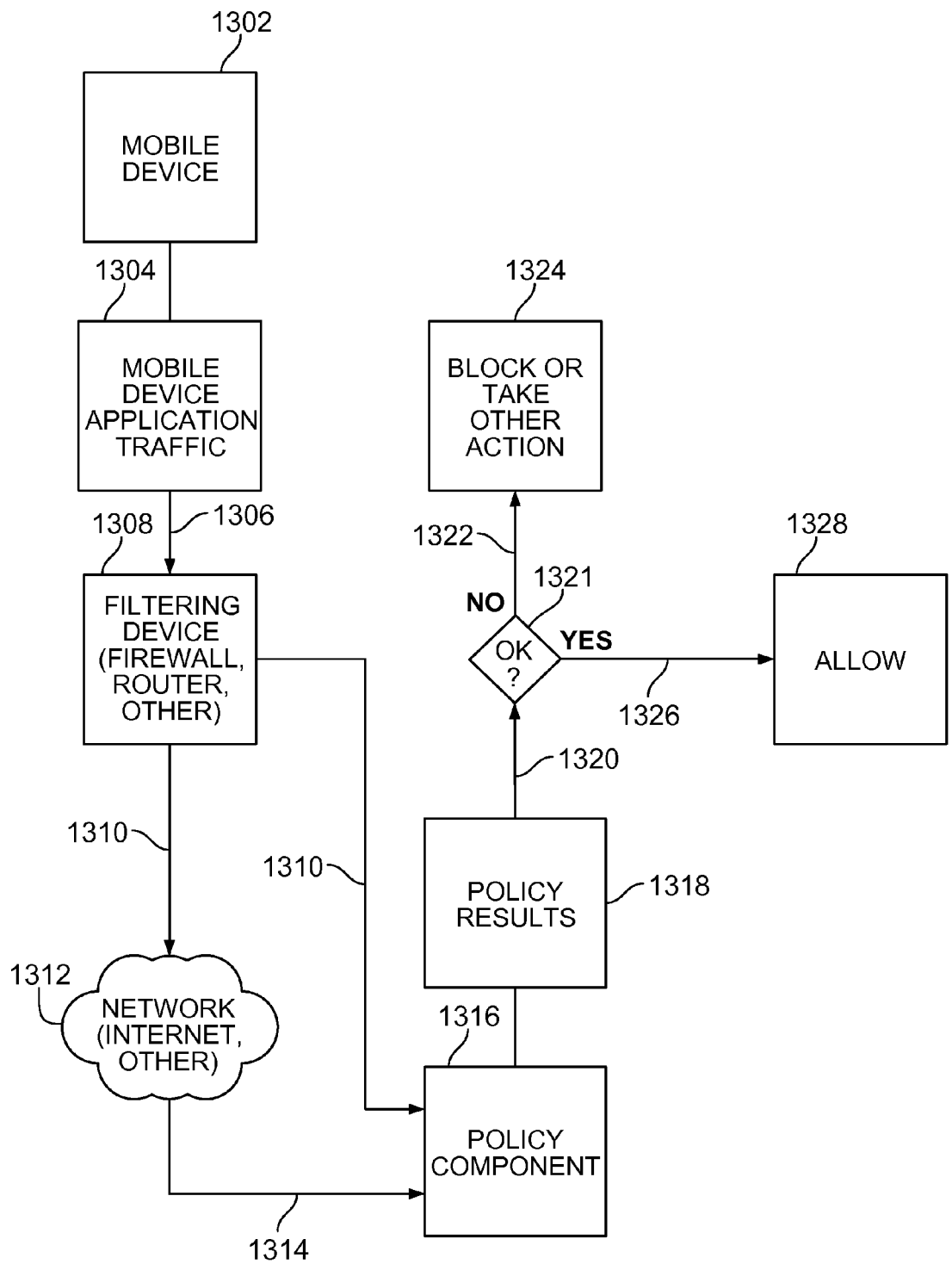
FIG. 13 illustrates a functional block diagram for in-line filtering of app data communications for mobile devices based on a policy in accordance with some embodiments.

FIG. 13 illustrates a functional block diagram for in-line filtering of app data communications for mobile devices based on a policy in accordance with some embodiments. In particular, FIG. 13 illustrates an example of in-line filtering of app data for mobile devices based on a policy using the filtering device to facilitate in-line filtering of app data for mobile devices based on a policy (e.g., filtering mobile device app traffic as defined by a policy, such as a mobile device traffic policy, which can be an enterprise policy for mobile device traffic or other configurable and/or customized policy).

As shown, a device 1302 (e.g., a mobile device, a desktop device, and/or another type of user device) communicates mobile device app traffic data 1304 that is intercepted at 1306 by a filtering device 1308 (e.g., an in-line filtering device, such as a gateway, security appliance (such as a firewall appliance that can be integrated with other security components, such as IDS/IPS, DLP, VPN, etc.), router, or another type of in-line filtering device). The mobile device app traffic data is forwarded by the filtering device 1308 at 1310 to a policy component 1316. As shown, the policy component 1316 can be integrated or local to the filtering device 1308 or can be implemented as a cloud-based service (e.g., a cloud-based app analysis system, such as described herein with respect to various embodiments) communicated to via a network 1312 (e.g., the Internet, and/or other networks, such as IP networks and/or cellular networks) as shown at 1310 and 1314. In some embodiments, the policy component 1316 identifies mobile device app traffic data 1304 that violates an aspect of a policy and generates policy results 1318 (e.g., identifying such mobile device app traffic data 1304 as being associated with mobile device app traffic data communications that are in compliance or in violation of a policy, and in some cases, identifying one or more apps installed on the mobile device 1302 associated with mobile device app traffic data communications that are determined to violate an aspect of the policy, such as an enterprise configured app risk policy, using various techniques described herein). At 1320, the policy results 1318 are communicated to the filtering device 1308. In some cases, as shown at 1321, based on the analysis results 1318, at 1322 the filtering device 1308 determines that the mobile device app traffic data 1304 is not compliant with a policy, and as shown at 1324, the filtering device 1308 blocks the mobile device app traffic data communication(s) or performs other corrective or responsive action(s). In some cases, as shown at 1321, based on the analysis results 1318, at 1326, the filtering device 1308 determines that the mobile device app traffic data is compliant with a policy, and as shown at 1328, the filtering device 1308 allows the mobile device app traffic data communication(s).

In particular, a growing need of organizations (e.g., enterprises, and/or other types of organizations) is to identify the source of traffic observed on the network, and to implement filtering of traffic-based knowledge of the source, combined with a policy (e.g., a mobile device traffic policy). Within the context of mobile apps, there is an increasing need to identify traffic that originates from mobile device operating systems or apps for mobile devices, and to allow for aspects of that traffic to be filtered, depending upon a configuration policy (e.g., a mobile device traffic policy). For example, assume that a user of the device 1302 is Bob, who is an employee of ACME Corporation and using ACME Corporation's corporate network to perform mobile device communications, and ACME Corporation implements a filtering device 1308 for their corporate network(s) to facilitate in-line filtering of app data for mobile devices based on a policy (e.g., an enterprise configured policy for ACME Corporation's enterprise network(s) for mobile device traffic). In this scenario, if Bob's mobile device executes an operating system that "phones home" in order to obtain a software update, then the filtering device 1308 can intercept this request, determine that it is originating from a particular operating system component on Bob's mobile device, consult a policy (e.g., an enterprise configured policy for ACME Corporation's enterprise network(s)), and then optionally allow or deny the request to complete based on the policy. As another example, if Bob's mobile device includes an app, such as a chat app or a file transfer app, and that app attempts to transfer data to a user outside of the network, the filtering device 1308 can identify the app in use based on characteristics of traffic being monitored by the filtering device, the filtering device can identify the transfer attempt, and the filtering device can perform a corrective and/or responsive action(s) based on a policy (e.g., an enterprise configured policy for ACME Corporation's enterprise network(s) for mobile device traffic), such as blocking the transfer and/or performing some other action(s). Various other use cases will now be apparent to one of ordinary skill in the art in view of the various embodiments disclosed herein.

In some embodiments, various techniques described herein are used to provide in-line filtering of data on cellular data networks. In particular, mobile devices frequently communicate over traditional IP networks, as well as over cellular data networks (e.g., 4G/LTE, and/or other cellular networks). Cellular data network providers generally have an interest in managing the security and privacy related aspects of their networks, and require the capability to filter mobile device software components and communications on the cellular data network side. The various embodiments and techniques described herein (e.g., as discussed above with respect to FIGS. 8-13) apply to cellular data networks, traditional IP networks, or any data network that carries application traffic as will now be apparent to one of ordinary skill in the art in view of the various embodiments disclosed herein.

In some embodiments, various techniques described herein are used to provide in-line filtering of mobile app related network data to facilitate mobile app network monitoring in conjunction with passive vulnerability analysis, intrusion detection (IDS), intrusion prevention (IPS), and/or data loss prevention (DLP). In particular, various passive vulnerability analysis systems, IDS, and/or IPS systems can be used that monitor the network in order to examine all traffic that is passing past a particular point in a network. This traffic can be analyzed and traffic patterns can be recognized that are used to determine whether vulnerable software, configurations, or other issues are present on the network. Such network-based analysis techniques can be used to build functionality into a platform to have it embed data obtained from a mobile app analysis system, or to communicate with a mobile app analysis system, in order to, for example, identify the transfer of mobile apps on the network that are known or determined to be likely to be/or at risk of being affected by security, privacy, and/or other related issues or policy defined issues, or to identify communications coming from or going to mobile apps, that are affected by these same kinds of issues. Identification of issues of concern can be used by systems of this type to generate alerts or take other corrective or responsive action(s). Accordingly, as will now be apparent to one of ordinary skill in the art in view of the various embodiments disclosed herein, combining such techniques and systems with techniques for in-line filtering of insecure or unwanted components or communications for mobile devices as disclosed herein provides an enhanced capability to detect and respond to various issues (e.g., insecure or unwanted mobile device software components or communications).

In some embodiments, various techniques described herein are used to provide in-line filtering of mobile app related network data to facilitate event alerting and response. For example, the various techniques and mechanisms described above can generally be applied to detect and/or block unwanted traffic and/or behaviors related to mobile devices. When detecting an insecure and/or unwanted event, the system has many options in terms of how to alert or respond, for example, blocking or performing other corrective and/or responsive action(s). For example, alerts can be sent from the system (e.g., a platform that includes the filtering device and/or the analysis component or cloud-based analysis system) via text message (SMS), automated phone call, e-mail, and/or other forms (e.g., logging, reporting, etc.). Responsive actions can include, for example, quarantining of malicious files or traffic, logging of details to a data store of some sort, quarantining of a mobile device, or shutting down a mobile device, and more.

Figure 14:
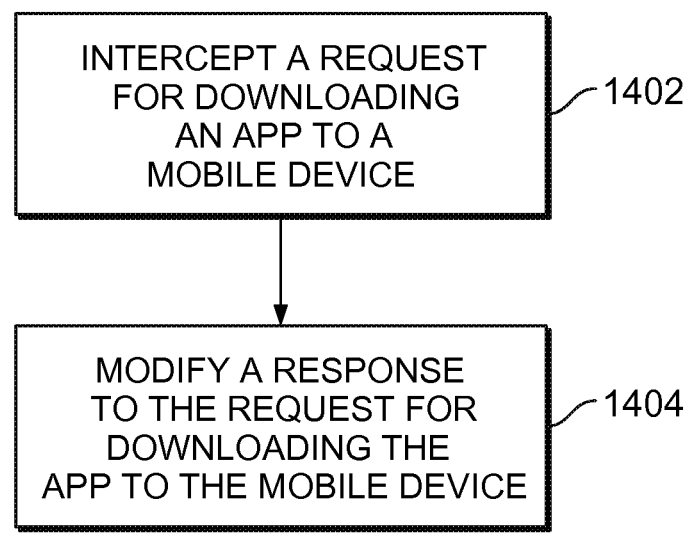
FIG. 14 illustrates a flow diagram for in-line filtering of apps for mobile devices in accordance with some embodiments.

FIG. 14 illustrates a flow diagram for in-line filtering of apps for mobile devices in accordance with some embodiments. At 1402, intercepting a request for downloading an application ("app") to a mobile device is performed. At 1404, modifying a response to the request for downloading the application to the mobile device is performed. In some embodiments, the response includes a notification that the application cannot be downloaded due to an application risk policy violation. In some embodiments, in-line filtering of apps for mobile devices further includes filtering traffic in-line from the mobile device to a network (e.g., the Internet); determining that the filtered traffic from the mobile device includes the request for downloading the application to the mobile device; and determining the response to the application request based on an application risk policy, in which the application risk policy is configured for an enterprise, and in which the mobile device is associated with the enterprise. In some embodiments, in-line filtering of apps for mobile devices further includes determining the response based on an application risk assessment for the application, in which the application risk assessment is based at least in part on a behavior associated with the application. In some embodiments, in-line filtering of apps for mobile devices further includes determining the application associated with the request violates a policy (e.g., an application risk policy) based on an application analysis (e.g., an automated risk assessment) of the application.

Figure 15:
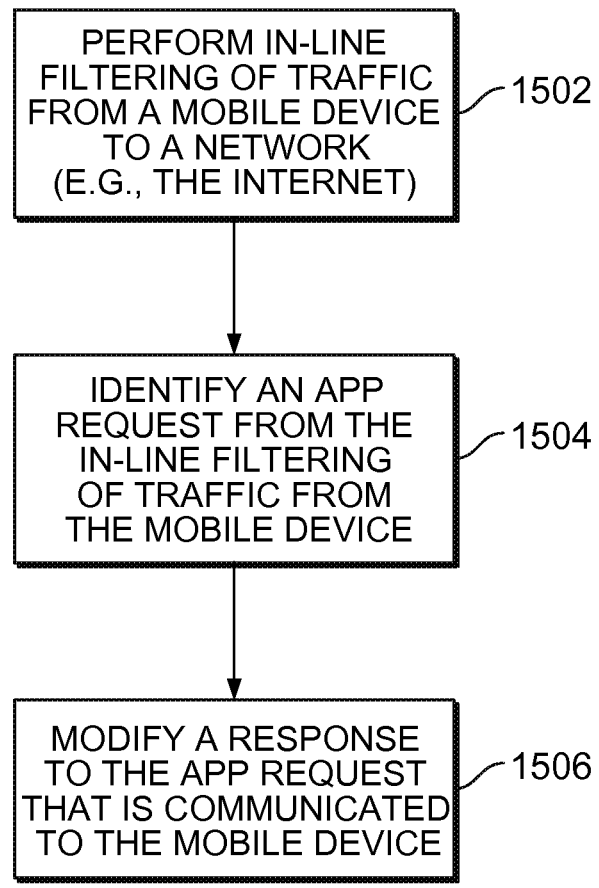
FIG. 15 illustrates another flow diagram for in-line filtering of apps for mobile devices in accordance with some embodiments.

FIG. 15 illustrates another flow diagram for in-line filtering of apps for mobile devices in accordance with some embodiments. At 1502, in-line filtering of traffic from a mobile device to a network (e.g., the Internet) is performed. At 1504, identifying an application ("app") request from the in-line filtering of traffic from the mobile device is performed, in which the application request includes a request to download an application to the mobile device. At 1506, modifying a response to the application request that is communicated to the mobile device is performed. In some embodiments, the modified response includes a notification that the application cannot be downloaded due to an application risk policy violation. In some embodiments, in-line filtering of apps for mobile devices further includes determining the response to the application request based on an application risk policy. In some embodiments, in-line filtering of apps for mobile devices further includes determining the response to the application request based on an application risk policy, in which the policy includes an application risk profile based on behavior associated with the application. In some embodiments, in-line filtering of apps for mobile devices further includes intercepting application requests from a plurality of mobile devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for in-line filtering of applications for mobile devices, comprising:
 a hardware processor of an inline filtering device configured to:
 intercept a request for downloading an application to a mobile device;
 throttle the request for downloading the application to the mobile device pending determination of a result of a risk analysis of the application based on an application risk policy, wherein the application is blocked from completing a transfer to the mobile device while it is throttled at the inline filtering device;
 generate a risk score of the application as a result of the risk analysis of the application based on the application risk policy, wherein the generation of the risk score comprises:
 check an application cache comprising:
 determine whether the application has been previously analyzed based on the application risk policy;
 in the event that the application has been previously analyzed, determine whether a risk score of the application is to be updated based on an updating rule that is triggered if a last time that the application has been previously analyzed exceeds a configured setting; and
 in the event that the application has been previously analyzed, and
 in the event that the updating rule was not triggered, return a previously determined risk score of the application; and
 if the application has been previously analyzed and the updating rule was triggered based on a determination that one or more new rules or analysis are available to perform on the application, then the application is to be analyzed again based on the application risk policy, and
 determine whether the application includes previously known malware, exhibits new malware behaviors, poses a privacy or security risk based on the application risk policy, or any combination thereof;
 modify a response to the request for downloading the application to the mobile device based on the risk score; and
 a memory coupled to the hardware processor and configured to provide the hardware processor with instructions.

2. The system recited in claim 1, wherein the response includes a notification that the application cannot be downloaded due to a violation of the application risk policy.

3. The system recited in claim 1, wherein the hardware processor is further configured to:
 filter traffic in-line from the mobile device to the Internet;
 determine that the filtered traffic from the mobile device includes the request for downloading the application to the mobile device; and
 determine the response to the application request based on the application risk policy, wherein the application risk policy is configured for an enterprise, and wherein the mobile device is associated with the enterprise.

4. The system recited in claim 1, wherein the hardware processor is further configured to:
 determine the response based on an application risk assessment for the application, wherein the application risk assessment is based at least in part on a behavior associated with the application.

5. The system recited in claim 1, wherein the hardware processor is further configured to:
 determine the application associated with the request violates the application risk policy based on an application analysis of the application.

6. A system for in-line filtering of applications for mobile devices, comprising:
 a hardware processor of an inline filtering device configured to:
 perform in-line filtering of traffic from a mobile device to the Internet;
 identify an application request from the in-line filtering of traffic from the mobile device to the Internet, wherein the application request includes a request to download an application to the mobile device;
 throttle the request for downloading the application to the mobile device pending determination of a result of a risk analysis of the application based on an application risk policy, wherein the application is blocked from completing a transfer to the mobile device while it is throttled at the inline filtering device;
 generate a risk score of the application as a result of the risk analysis of the application based on the application risk policy, wherein the generation of the risk score comprises:
 check an application cache comprising:
 determine whether the application has been previously analyzed based on the application risk policy;
 in the event that the application has been previously analyzed, determine whether a risk score of the application is to be updated based on an updating rule that is triggered if a last time that the application has been previously analyzed exceeds a configured setting; and
 in the event that the application has been previously analyzed, and
 in the event that the updating rule was not triggered, return a previously determined risk score of the application; and
 if the application has been previously analyzed and the updating rule was triggered based on a determination that one or more new rules or analysis are available to perform on the application, then the application is to be analyzed again based on the application risk policy, and
 determine whether the application includes previously known malware, exhibits new malware behaviors, poses a privacy or security risk based on the application risk policy, or any combination thereof;
 modify a response to the application request that is communicated to the mobile device based on the risk score; and
 a memory coupled to the hardware processor and configured to provide the hardware processor with instructions.

7. The system recited in claim 6, wherein the modified response includes a notification that the application cannot be downloaded due to a violation of the application risk policy.

8. The system recited in claim 6, wherein the hardware processor is further configured to:
 determine the response to the application request based on the application risk policy.

9. The system recited in claim 6, wherein the hardware processor is further configured to:

determine the response to the application request based on the application risk policy, wherein the application risk policy includes an application risk profile based on behavior associated with the application.

10. The system recited in claim 6, wherein the hardware processor is further configured to:
intercept application requests from a plurality of mobile devices.

11. A method of in-line filtering of applications for mobile devices, comprising:
performing in-line filtering of traffic from a mobile device to the Internet using a hardware processor of an inline filtering device;
identifying an application request from the in-line filtering of traffic from the mobile device to the Internet, wherein the application request includes a request to download an application to the mobile device;
throttling the request for downloading the application to the mobile device pending determination of a result of a risk analysis of the application based on an application risk policy, wherein the application is blocked from completing a transfer to the mobile device while it is throttled at the inline filtering device;
generating a risk score of the application as a result of the risk analysis of the application based on the application risk policy, wherein the generation of the risk score comprises:
checking an application cache comprising:
determining whether the application has been previously analyzed based on the application risk policy;
in the event that the application has been previously analyzed, determining whether a risk score of the application is to be updated based on an updating rule that is triggered if a last time that the application has been previously analyzed exceeds a configured setting; and
in the event that the application has been previously analyzed, and
in the event that the updating rule was not triggered, returning a previously determined risk score of the application; and
if the application has been previously analyzed and the updating rule was triggered based on a determination that one or more new rules or analysis are available to perform on the application, then the application is to be analyzed again based on the application risk policy, and
determine whether the application includes previously known malware, exhibits new malware behaviors, poses a privacy or security risk based on the application risk policy, or any combination thereof;
modifying a response to the application request that is communicated to the mobile device based on the risk score.

12. The method of claim 11, wherein the modified response includes a notification that the application cannot be downloaded due to a violation of the application risk policy.

13. The method of claim 11, further comprising:
determining the response to the application request based on the application risk policy.

14. The method of claim 11, further comprising:
determining the response to the application request based on the application risk policy, wherein the application risk policy includes an application risk profile based on behavior associated with the application.

15. The method of claim 11, further comprising:
intercepting application requests from a plurality of mobile devices.

16. A system for in-line filtering of insecure or unwanted mobile device communications for mobile devices, comprising:
a hardware processor of an inline filtering device configured to:
intercept a communication from a mobile device at the in-line filtering device;
determine whether the communication from the mobile device includes an insecure or unwanted mobile device communication, wherein the communication from the mobile device includes a request to search for an application to download to the mobile device; and
throttle the communication at the inline filtering device pending determination of a result of a risk analysis of the application based on a traffic policy for mobile device communications associated with the mobile device, wherein the traffic policy for mobile device communications associated with the mobile device includes at least one rule based at least in part on an application search request, and wherein the communication is blocked from completing a transfer of a response to the communication to the mobile device while it is throttled at the inline filtering device;
generate a risk score of the application as a result of the risk analysis of the application based on the application risk policy, wherein the generation of the risk score comprises:
check an application cache comprising:
determine whether the application has been previously analyzed based on the application risk policy;
in the event that the application has been previously analyzed, determine whether a risk score of the application is to be updated based on an updating rule that is triggered if a last time that the application has been previously analyzed exceeds a configured setting; and
if the application has been previously analyzed and the updating rule was triggered based on a determination that one or more new rules or analysis are available to perform on the application, then the application is to be analyzed again based on the application risk policy, and
determine whether the application includes previously known malware, exhibits new malware behaviors, poses a privacy or security risk based on the application risk policy, or any combination thereof;
in the event that the application has been previously analyzed, and
in the event that the updating rule was not triggered, return a previously determined risk score of the application; and
a memory coupled to the hardware processor and configured to provide the hardware processor with instructions.

17. The system recited in claim 16, wherein the determination that the communication from the mobile device includes an insecure or unwanted mobile device communication is based on the traffic policy associated with the mobile device.

18. The system recited in claim 16, wherein the hardware processor is further configured to:
block the communication from the mobile device if it is determined that the communication from the mobile device is an insecure or unwanted mobile device communication based on the traffic policy for mobile device communications.

19. The system recited in claim 16, wherein the communication from the mobile device includes an application search request from the mobile device to a public application market.

20. The system recited in claim 16, wherein the communication from the mobile device includes an application search request from the mobile device to a public application market notification, and wherein the processor is further configured to:
    modify a response to the application search request to filter applications listed in the response based on an application risk policy, wherein the modified response includes a notification that one or more applications responsive to the application search request were removed from the response.

21. The system recited in claim 1, wherein check an application cache further comprises:
    generate a hash value of the application, wherein the hash value can be used to query the application cache for a match.

22. The system recited in claim 1, wherein check an application cache further comprises:
    query the application cache using a bulk query to request checking the application cache for each of a plurality of applications including the application requested for downloading to the mobile device.

23. The system recited in claim 1, wherein the application requested for downloading to the mobile device is an encrypted version of the application, and wherein the hardware processor is further configured to:
    correlate the encrypted version of the application with an unencrypted version of the application to match the application with the unencrypted version of the application based on a digital signature of an encrypted executable image of the application.

24. The system recited in claim 1, wherein throttle the request for downloading the application to the mobile device includes quarantining the application at the inline filtering device until receipt of an acknowledgement of potential threats associated with the application are presented in a display on the mobile device.

25. The system recited in claim 1, wherein the hardware processor is further configured to:
    if checking the application cache does not result in a match, then the application was not previously analyzed based on the application risk policy, and the generation of the risk score further comprises:
    determine whether the application includes previously known malware, exhibits new malware behaviors, poses a privacy or security risk based on the application risk policy, or any combination thereof.

26. The system recited in claim 1, wherein the hardware processor is further configured to:
    if the application has been previously analyzed and the updating rule was triggered, then the application is to be analyzed again based on the application risk policy, and the generation of the risk score further comprises:
    determine whether the application includes previously known malware, exhibits new malware behaviors, poses a privacy or security risk based on the application risk policy, or any combination thereof.

27. The system recited in claim 1, wherein the hardware processor is further configured to:
    determine whether the application is marked as private; and
    in the event the application is marked as private, do not perform the check of the application cache, wherein the application is marked as private to be hidden from application cache queries.

* * * * *